United States Patent
Kosaka

(10) Patent No.: US 7,945,367 B2
(45) Date of Patent: May 17, 2011

(54) TRAVEL DEVICE AND CONTROL METHOD OF TRAVEL DEVICE

(75) Inventor: Yusuke Kosaka, Chofu (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 166 days.

(21) Appl. No.: 12/511,216

(22) Filed: Jul. 29, 2009

(65) Prior Publication Data

US 2010/0030441 A1    Feb. 4, 2010

(30) Foreign Application Priority Data

Jul. 29, 2008 (JP) ................................. 2008-194845

(51) Int. Cl.
*B60W 30/02* (2006.01)

(52) U.S. Cl. ............... 701/70; 701/69; 701/84; 701/88; 701/90

(58) Field of Classification Search .................. 701/69, 701/70, 72, 78, 79, 80, 81, 82, 84, 87, 88, 701/90, 99; 477/2–6, 37–41; 180/6.28, 6.3, 180/6.48
See application file for complete search history.

(56) References Cited

U.S. PATENT DOCUMENTS

2004/0176899 A1* 9/2004 Hallowell ................. 701/84
2006/0258505 A1* 11/2006 Vafidis et al. ............ 477/5

FOREIGN PATENT DOCUMENTS

| JP | 2005-006435 A1 | 1/2005 |
| JP | 2006-211899 A | 8/2006 |
| JP | 2006-315666 A | 11/2006 |
| JP | 4291732 | 4/2009 |

* cited by examiner

*Primary Examiner* — Richard M. Camby
(74) *Attorney, Agent, or Firm* — Kenyon & Kenyon LLP

(57) ABSTRACT

A travel device includes an attitude detector that detects attitude information of a main body, a vehicle velocity detector that detects a vehicle velocity, a pseudo-attitude command generator that generates a pseudo-attitude information command of the main body based on the detected attitude information, the detected vehicle velocity, an input attitude information command and an input vehicle velocity command when accelerating or decelerating a vehicle, and an attitude controller that performs attitude control in such a way that the attitude information detected by the attitude detector follows the pseudo-attitude information command of the main body generated by the pseudo-attitude command generator.

9 Claims, 15 Drawing Sheets

Fig. 1A
Fig. 1B
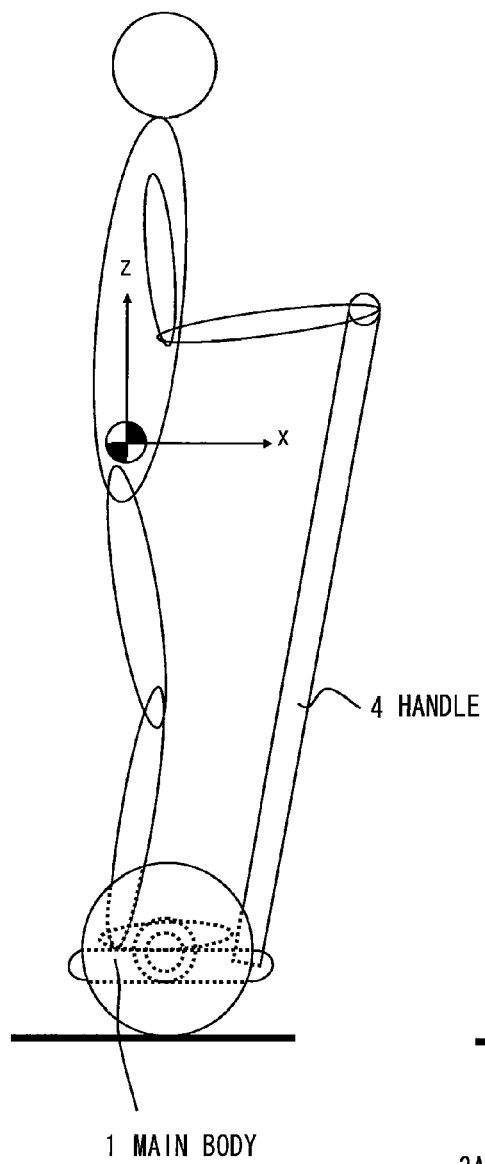
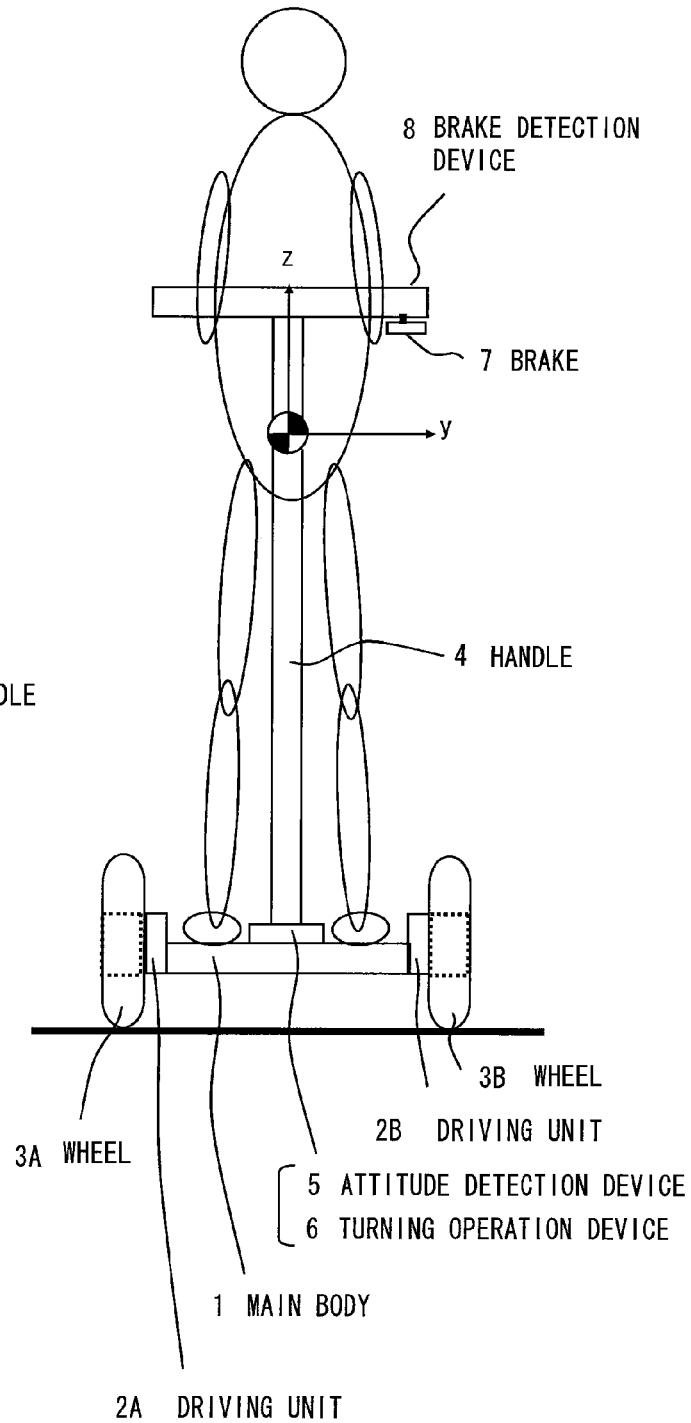

4 HANDLE
7 BRAKE LEVER
10 BRACKET

9 RETURN SPRING
4 HANDLE
7 BRAKE LEVER
10 BRACKET
8 BRAKE DETECTION DEVICE (POTENTIOMETER OR ROTARY ENCODER)

TRAVEL DEVICE AND CONTROL METHOD OF TRAVEL DEVICE

BACKGROUND OF THE INVENTION

1. Field of the Invention

The present invention relates to a travel device and a control method of the same and, particularly, to a travel device that performs drive control based on its own detected attitude information and a control method of the same.

2. Description of Related Art

Travel devices for traveling with a person on board with various body constructions and vehicle structures are proposed that detect their own attitude information and performs drive control based on the detected attitude information. Such travel devices make motion according to the attitude control principle based on an inverted pendulum and, specifically, detect their own attitude information by using a gyroscope and an acceleration sensor incorporated therein, compute a rotation command to a motor so as to maintain the attitude and transmit rotation command data to a motor control device. The travel devices can travel according to a change in the center of gravity and posture of a person on board while maintaining their attitude based on such feedback control.

For example, Japanese Unexamined Patent Publications Nos. 2006-211899 and 2006-315666 disclose a coaxial two-wheel vehicle in which two wheels are mounted coaxially. Such a coaxial two-wheel vehicle is structurally unstable fore and aft and therefore stabilizes the attitude by controlling the wheels based on feedback from an attitude sensor. Further, in the coaxial two-wheel vehicle, the operation of the vehicle such as forward and backward movement and left and right turns is performed in response to a command according to the shift of a rider's center of gravity, a command according to the tilt of a step, a command from a control stick or the like. Alternatively, remote control operation by external command input or automatic movement based on trajectory planning may be performed in some cases.

However, in a control system of the coaxial two-wheel vehicle related to the present invention, there is a concern that adjustment of control parameters in an attitude controller is extremely difficult, thus requiring lots of work and time for the adjustment. Further, there is a concern that robustness against rider's weight variation or the like is low.

The concerns of the coaxial two-wheel vehicle related to the present invention are described hereinafter in further detail. In the related coaxial two-wheel vehicle, a control system that generates a torque command and inputs it to a motor amplifier is typically used in the case of making control of at least one of a vehicle pitch angle and pitch angular velocity only, or, making both control of at least one of a vehicle pitch angle and pitch angular velocity and control of at least one of a vehicle position, velocity, directional angle (yaw direction) and directional velocity (yaw velocity) simultaneously.

FIG. 15 is a control block diagram showing a control system shown in FIG. 33 of Japanese Unexamined Patent Publication No. 2006-211899. In the control system shown in FIG. 15, K1 and K2 are used as control parameters related to control of the vehicle pitch angle and pitch angular velocity, and K3 and K4 are used as control parameters related to control of the vehicle position and velocity. It is thus necessary in the control system shown in FIG. 15 to adjust the control parameters K1 to K4 in such a way that control of the vehicle pitch angle and pitch angular velocity and control of the vehicle position and velocity are implemented simultaneously.

Because the coaxial two-wheel vehicle is the inverted pendulum, there is a physical constraint that it is always necessary to tilt a vehicle pitch angle when performing control action such as acceleration or deceleration. For example, in the case of decelerating and then halting the coaxial two-wheel vehicle, if the vehicle is controlled to decelerate simply, the coaxial two-wheel vehicle fails to maintain the inverted position due to the inertia and thus falls down frontward. Therefore, in the case of decelerating and then halting the coaxial two-wheel vehicle, it is necessary to control the vehicle so as to accelerate forward in the traveling direction once, so that the vehicle comes ahead of a rider (i.e., it is necessary to change the vehicle pitch angle in such a way that the upper body of the rider is bent backward). After the upper body of the rider is bent backward, the vehicle velocity is reduced gradually so that it halts with the inverted position maintained at the time when the vehicle velocity reaches zero, thereby avoiding falling down of the vehicle during deceleration. Accordingly, during acceleration or deceleration action, it is incapable of controlling the vehicle pitch angle and the vehicle position independently of each other, such as changing the vehicle position with the vehicle pitch angle maintained horizontally or making the vehicle stand still at a given position with the vehicle pitch angle tilting. Hence, the control parameters (K1 and K2 in FIG. 15) related to the vehicle pitch attitude (pitch angle and pitch angular velocity) and the control parameters (K3 and K4 in FIG. 15) related to the vehicle position and velocity are closely correlated with each other and cannot be determined independently of each other.

If accurate modeling of a control target is possible, a relationship between control parameters can be mathematically determined by using the optimal regulator technique or the like. However, adjustment of control parameters is generally difficult due to friction, disturbance, error and so on, which cannot be modeled. Particularly, adjustment of control parameters is extremely difficult due to error of the mass and the moment of inertia or the like caused by varying height and weight of riders.

As described above, in the control system of the related coaxial two-wheel vehicle, there is a concern that adjustment of control parameters in the attitude controller is extremely difficult, and lots of work and time are required for the adjustment. Further, there is a concern that robustness against rider's weight variation or the like is low.

In light of the above concerns, it is desirable to provide a travel device that enables easy implementation of a control system capable of performing quick and easy adjustment of control parameters and further having high robustness, and a control method of the same.

SUMMARY OF THE INVENTION

According to an embodiment of the present invention, there is provided a travel device including a driving unit that independently drives a plurality of wheels mounted coaxially, a main body that joins the plurality of wheels, an attitude detector that detects at least one of an attitude angle and an attitude angular velocity as attitude information of the main body, a wheel angular velocity detector that detects a relative angular velocity between the main body and the plurality of wheels as a wheel angular velocity, a vehicle velocity detector that detects a vehicle velocity based on the detected wheel angular velocity of the plurality of wheels and the attitude angular velocity detected by the attitude detector, a pseudo-attitude command generator that generates at least one of a pseudo-attitude angle command and a pseudo-attitude angular velocity command as a pseudo-attitude information command of the main body based on the detected attitude information, the detected vehicle velocity, an input attitude information command and an input vehicle velocity command when accelerating or decelerating a vehicle, and an attitude controller that generates a drive command of the driving unit in such a way that the attitude information detected by the attitude detector follows the pseudo-attitude information command of the main body generated by the pseudo-attitude command generator, wherein a motor of the driving unit is driven for traveling according to the drive command generated by the attitude controller.

In this configuration, the pseudo-attitude command generator that generates a command to be input to the attitude controller is provided in addition to the attitude controller that controls the attitude of the vehicle, and, when accelerating or decelerating the vehicle, the pseudo-attitude command generator generates the pseudo-attitude command based on the vehicle velocity command. Adjustment of control parameters in the attitude controller can be thereby performed relatively easily without particular need of an accurate model, and high robustness against load variation or the like can be achieved. Further, because control parameters of the pseudo-attitude command generator can be adjusted independently of the control parameters of the attitude controller, adjustment of the control parameters is facilitated. It is thereby possible to easily implement a control system capable of performing quick and easy adjustment of control parameters of the system as a whole and further having high robustness.

The travel device may further include a wheel angle detector that detects a relative angle between the main body and the plurality of wheels as a wheel angle and a vehicle position detector that detects a vehicle position of the vehicle based on the detected wheel angle of the plurality of wheels and the attitude angle detected by the attitude detector, and the pseudo-attitude command generator may generate the pseudo-attitude information command of the main body based on the detected attitude information, the vehicle velocity detected by the vehicle velocity detector, the vehicle position detected by the vehicle position detector, the input attitude information command, the input vehicle velocity command and an input vehicle position command. By generating the pseudo-attitude information command based on the vehicle position command in addition to the vehicle velocity command, it is possible to control the driving of the travel device more suitably when accelerating or decelerating the vehicle.

The travel device may further include a brake lever and a vehicle velocity command setter that sets a vehicle velocity command of the vehicle, and when the brake lever is operated, the vehicle velocity command setter may change the set vehicle velocity command according to an operation amount of the brake lever and the vehicle velocity detected by the vehicle velocity detector. This enables implementation of both travel control during normal traveling and vehicle velocity control according to operation of the brake lever simultaneously in one control system, and it is thereby possible to control the driving of the travel device more suitably.

Further, when the vehicle velocity detected by the vehicle velocity detector exceeds a predetermined velocity limit, the input vehicle velocity command may be changed according to the vehicle velocity detected by the vehicle velocity detector. This enables implementation of vehicle velocity control when exceeding a velocity limit in addition simultaneously, and it is thereby possible to control the driving of the travel device more suitably.

The travel device may further include a velocity controller that generates a torque command for driving the plurality of wheels, and the attitude controller may generate a wheel angular velocity command of the driving unit based on the detected attitude information and the input attitude information command, the velocity controller may generate a torque command of the plurality of wheels based on the wheel angular velocity command generated by the attitude controller and the wheel angular velocity detected by the wheel angular velocity detector, and the motor of the driving unit may be driven for traveling according to the generated torque command. In this configuration, a control system composed of the velocity controller capable of speeding up inexpensively is included in the inside control loop of a control system composed of the attitude controller, and it is thereby possible to achieve higher performance control with lower costs of the system as a whole. It is further possible to improve the stability in the traveling direction and allow stable motion even when one wheel is off the ground during traveling.

The travel device may further include a turning controller that generates a turning velocity command of the travel device based on an input turning information command, and the attitude controller may generate an attitude velocity command of the driving unit based on the detected attitude information and the input attitude information command, the wheel angular velocity command of the travel device may be generated by adding or subtracting the attitude velocity command generated by the attitude controller and the turning velocity command generated by the turning controller and input to the velocity controller, and the velocity controller may perform velocity control in such a way that the wheel angular velocity detected by the wheel angular velocity detector follows the generated wheel angular velocity command. This enables implementation of attitude control, velocity control and turn control simultaneously with lower costs of the system as a whole, and it is possible to achieve higher performance control.

The travel device may further include a torque controller that generates a torque command for driving the plurality of wheels, and the attitude controller may generate a first torque command of the driving unit based on the detected attitude information and the input attitude information command, the torque controller may generate a torque command of the plurality of wheels based on the first torque command generated by the attitude controller, and the motor of the driving unit may be driven for traveling according to the generated torque command.

The travel device may further include a turning detector that detects at least one of a turning angle and a turning angular velocity as turning information of the travel device and a turning controller that generates a second torque command of the travel device based on an input turning information command, and the torque command of the travel device may be generated by adding or subtracting the first torque command generated by the attitude controller and the second torque command generated by the turning controller and input to the torque controller, and the turning controller may perform torque control in such a way that the turning information detected by the turning detector follows the input turning information command.

According to an embodiment of the present invention, there is provided a control method of a travel device that detects at least one of an attitude angle and an attitude angular velocity as attitude information of a main body joining a plurality of wheels mounted coaxially and travels by independently driving the plurality of wheels, the method including, when accelerating or decelerating a vehicle, detecting a relative angular velocity between the main body and the plurality of wheels as a wheel angular velocity, detecting the attitude angular velocity and detecting a vehicle velocity based on the detected attitude angular velocity and the detected wheel angular velocity of the plurality of wheels, setting a vehicle velocity command of the vehicle, generating at least one of a pseudo-attitude angle command and a pseudo-attitude angular velocity command as a pseudo-attitude information command of the main body based on the detected attitude information, the detected vehicle velocity, an input attitude information command and the set vehicle velocity command, and performing attitude control in such a way that the detected attitude information follows the generated pseudo-attitude information command of the main body.

In this method, pseudo-attitude command generation processing that generates a command to be used for attitude control is performed in addition to attitude control that controls the attitude of the vehicle, and, when accelerating or decelerating the vehicle, the pseudo-attitude command generation processing generates the pseudo-attitude command based on the vehicle velocity command. Adjustment of control parameters in an attitude controller that is used for the attitude control can be thereby performed relatively easily without particular need of an accurate model, and high robustness against load variation or the like can be achieved. Further, because control parameters of a pseudo-attitude command generator that is used for the pseudo-attitude command generation processing can be adjusted independently of the control parameters of the attitude controller, adjustment of the control parameters is facilitated. It is thereby possible to easily implement a control system capable of performing quick and easy adjustment of control parameters of the system as a whole and further having high robustness.

According to the embodiments of the present invention described above, it is possible to provide a travel device that enables easy implementation of a control system capable of performing quick and easy adjustment of control parameters and further having high robustness, and a control method of the same.

The above and other objects, features and advantages of the present invention will become more fully understood from the detailed description given hereinbelow and the accompanying drawings which are given by way of illustration only, and thus are not to be considered as limiting the present invention.

BRIEF DESCRIPTION OF THE DRAWINGS

FIG. 1A is a view showing an exemplary configuration of a travel device according to a first embodiment of the present invention;

FIG. 1B is a view showing an exemplary configuration of the travel device according to the first embodiment of the present invention;

DESCRIPTION OF THE PREFERRED EMBODIMENTS

First Embodiment

Figure 2A:
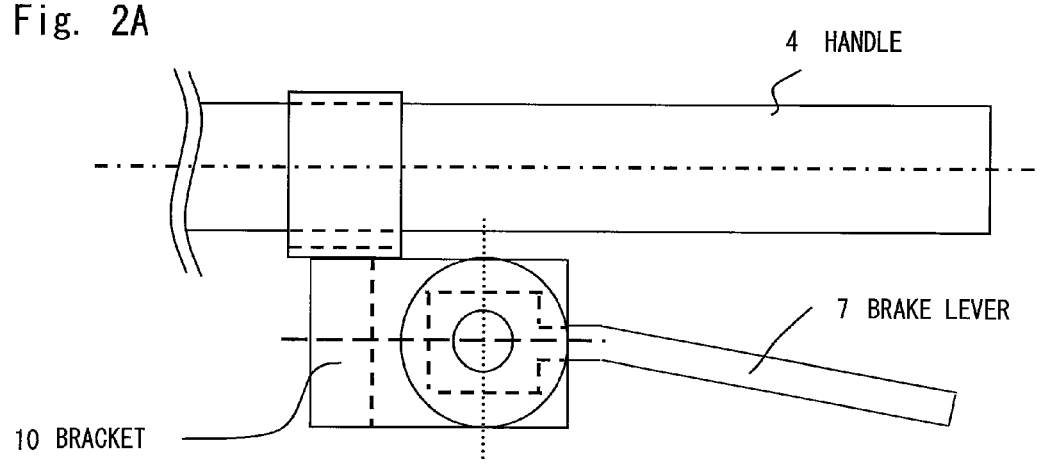
FIG. 2A is a view showing a configuration of a substantial part of the travel device according to the first embodiment of the present invention.

Exemplary embodiments of the present invention are described hereinafter with reference to the drawings. FIGS. 1A and 1B are views showing an exemplary configuration of a travel device according to a first embodiment of the present invention. FIG. 1A is a front view, and FIG. 1B is a side view. In FIGS. 1A and 1B, the travel device according to the first embodiment is a coaxial two-wheel vehicle in which wheels 3A and 3B are mounted in parallel on a coaxial line to a main body 1 on which a rider places their feet.

A coordinate system for the whole part of the coaxial two-wheel vehicle to be used in the following description is defined as follows. As illustrated in FIGS. 1A and 1B, the direction perpendicular to the axle is the x-axis, the axle direction is the y-axis, the vertical direction is the z-axis, the axis rotating about the axle (about the y-axis) is the pitch axis, and the direction of rotation on the x-y plane when viewed from above is the yaw axis.

The travel device according to the first embodiment includes the main body 1, a pair of driving units 2A and 2B that are mounted coaxially to the main body 1, the wheels 3A and 3B that are rotatively driven by the driving units 2A and 2B, respectively, a T-shaped handle 4 for a rider to hold, an attitude detection device 5 that detects the forward and backward tilt (about the y-axis) of the main body 1, a turning operation device 6 that designates turning operation, a brake lever 7 that is attached at the end of the handle 4, and a brake detection device 8 that detects operation information (operation amount, operation velocity) of the brake lever 7. Further, the main body 1 includes a control device that performs control of the vehicle, which is described later, although not shown. The main body 1 may further incorporate a sensor or a switch (not shown) that detects the presence of a rider.

Figure 2B:
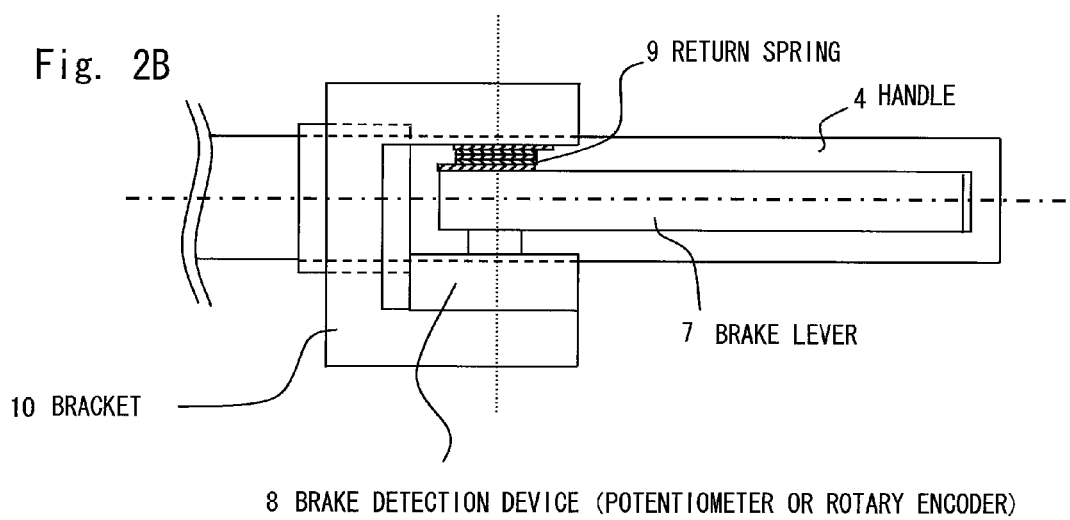
FIG. 2B is a view showing a configuration of a substantial part of the travel device according to the first embodiment of the present invention.

FIGS. 2A and 2B are views showing an exemplary configuration of the brake lever 7 and its vicinity. FIG. 2A is a top view, and FIG. 2B is a side view. As shown in FIGS. 2A and 2B, the brake lever 7 is mounted to the handle 4, and the operation amount and the operation velocity of the brake lever 7 are detected by a potentiometer or a rotary encoder serving as the brake detection device 8. Further, a return spring 9 is attached to the brake lever 7, and the brake detection device 8 and the return spring 9 are contained in a bracket 10.

Figure 3:
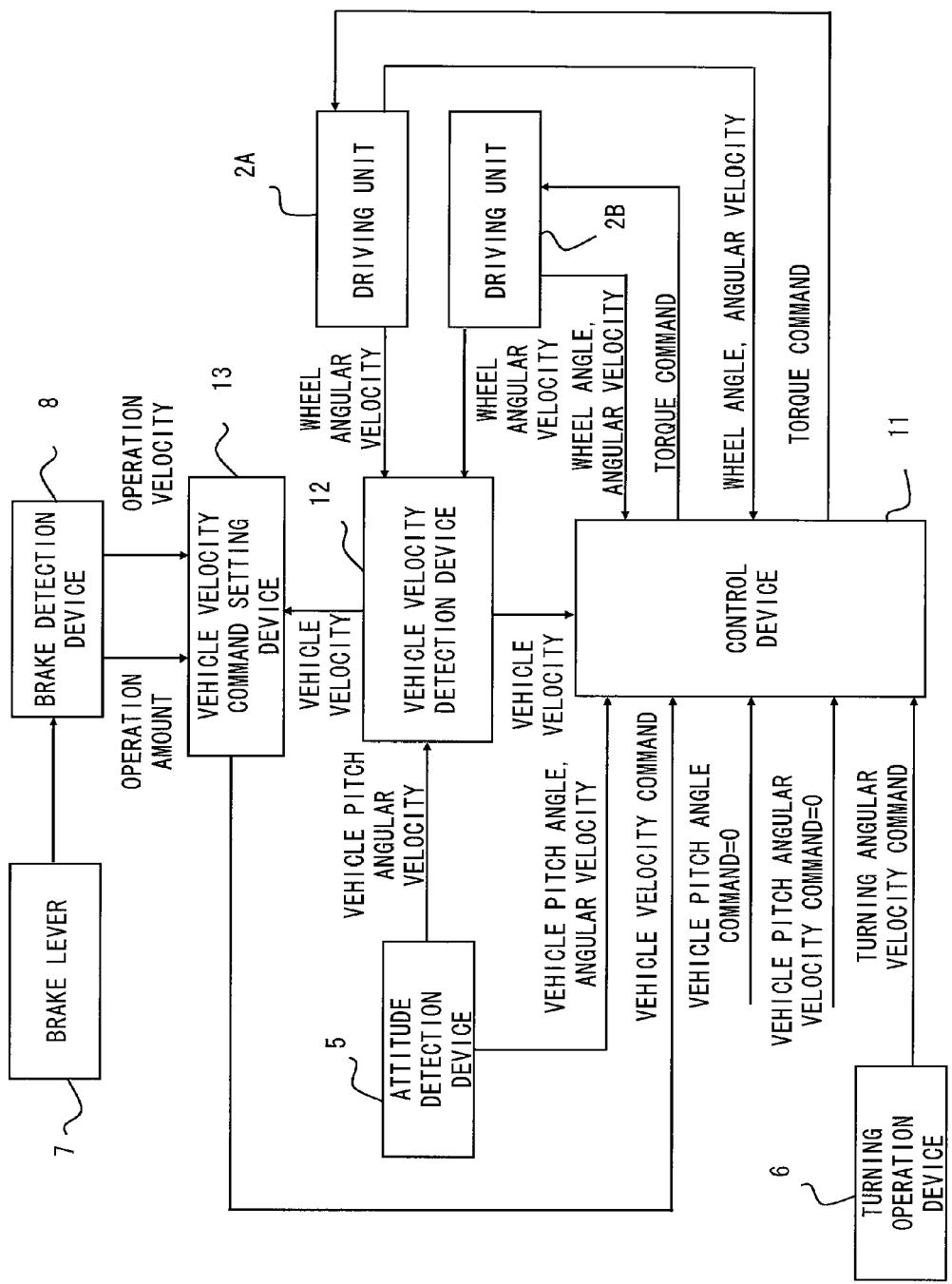
FIG. 3 is a control block diagram showing a configuration of vehicle control of a coaxial two-wheel vehicle according to the first embodiment.

FIG. 3 is a block diagram showing a configuration of vehicle control of the coaxial two-wheel vehicle according to the first embodiment. The attitude detection device 5 detects attitude information of the main body 1. The attitude information of the main body 1 includes at least one of an attitude angle (vehicle pitch angle) and an attitude angular velocity (vehicle pitch angular velocity). Further, an attitude information command of the main body 1 is input to a control device 11. The attitude information command of the main body 1 includes at least one of an attitude angle command (vehicle pitch angle command) and an attitude angular velocity command (vehicle pitch angular velocity command).

The turning operation device 6 generates a vehicle turning angle command and turning angular velocity command as turning information command. The turning operation device 6 outputs at least one of the generated turning angle command and turning angular velocity command to the control device 11. In the following description, at least the turning angular velocity command is output to the control device 11. The turning operation device 6 receives operation of the handle 4 by a rider, operation of a turning handle (not shown) by a rider or the like and generates the turning angle command and the turning angular velocity command according to the operation amount. For the turning operation device 6, the technique that has been proposed by the applicant (Japanese Unexamined Patent Publication No. 2006-315666) may be applied. According to the technique, a turning command is input according to a roll angle of a vehicle that tilts with the shift of a rider's center of gravity. In the following, the turning angular velocity command is described as being a yaw angular velocity command.

The control device 11 controls the vehicle so as to stably follow its target values (vehicle pitch angle command, vehicle pitch angular velocity command, vehicle velocity command, yaw angular velocity command). Specifically, the control device 11 calculates a driving torque necessary for the entire system of the travel device to be stabilized without falling down based on those target values and information input from the attitude detection device 5 and the turning operation device 6, and drives the respective motors of the driving units 2A and 2B. Then, the wheel angle and wheel angular velocity of the wheels 3A and 3B generated by the rotation of the respective motors of the driving units 2A and 2B are fed back to the control device 11. In such a configuration of vehicle control, the coaxial two-wheel vehicle moves forward or backward when a rider displaces the center of gravity forward or backward, and turns leftward or rightward when a rider operates the turning operation device 6.

If a rider operates the brake lever 7 during traveling, the brake detection device 8 detects the operation amount and the operation velocity of the operated brake lever 7. A vehicle velocity detection device 12, which serves as a vehicle velocity detector, calculates the current vehicle velocity from a wheel angular velocity, which is a relative angular velocity between the main body 1 and the wheels, that is detected by the driving units 2A and 2B, and the vehicle pitch angular velocity that is detected by the attitude detection device 5. Then, a vehicle velocity command setting device 13, which serves as a vehicle velocity command setter, determines a deceleration from outputs of the brake detection device 8 and the vehicle velocity detection device 12 and thereby determines a vehicle velocity command. Thus, by the above processing, the vehicle velocity command setting device 13 appropriately adjusts a deceleration according to the brake operation amount and the brake operation velocity. The control device 11 controls the vehicle to stably follow the vehicle pitch angle command (=0; i.e., maintaining the horizontal position), the vehicle pitch angular velocity command (=0; i.e., maintaining the current angle), the vehicle velocity command and the yaw angular velocity command.

The vehicle velocity command setting device 13 may change the set vehicle velocity command according to the vehicle velocity detected by the vehicle velocity detection device 12 when the vehicle velocity detected by the vehicle velocity detection device 12 exceeds a predetermined velocity limit, not limited to when a rider operates the brake lever 7. Further, the vehicle velocity command setting device 13 may set the vehicle velocity detected by the vehicle velocity detection device 12 as the vehicle velocity command during normal traveling, thereby implementing travel control during normal traveling and velocity control according to operation of the brake lever simultaneously based on the same control system.

Figure 4:
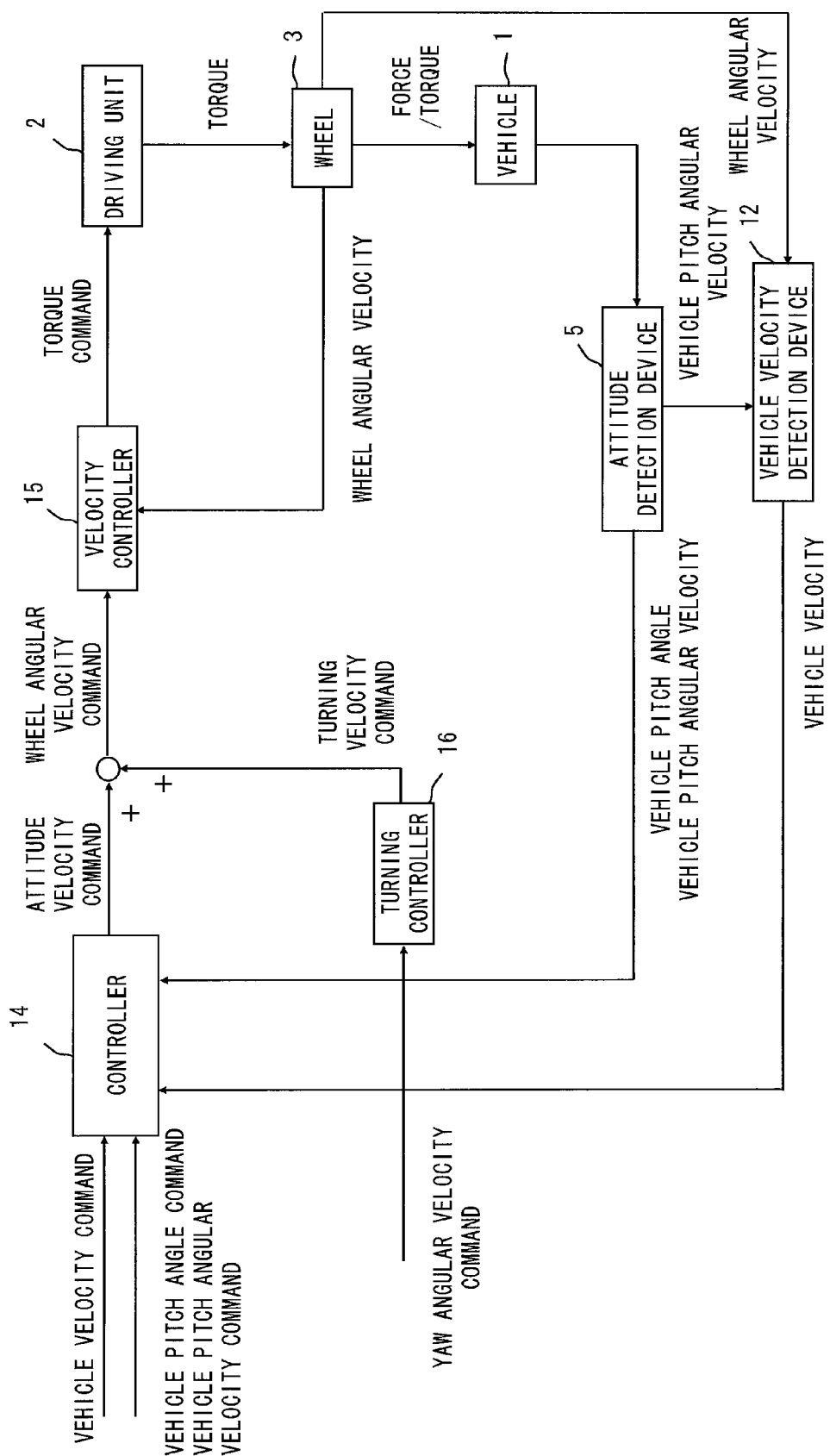
FIG. 4 is a control block diagram showing a configuration of a motion control system of the coaxial two-wheel vehicle according to the first embodiment.
Figure 5:
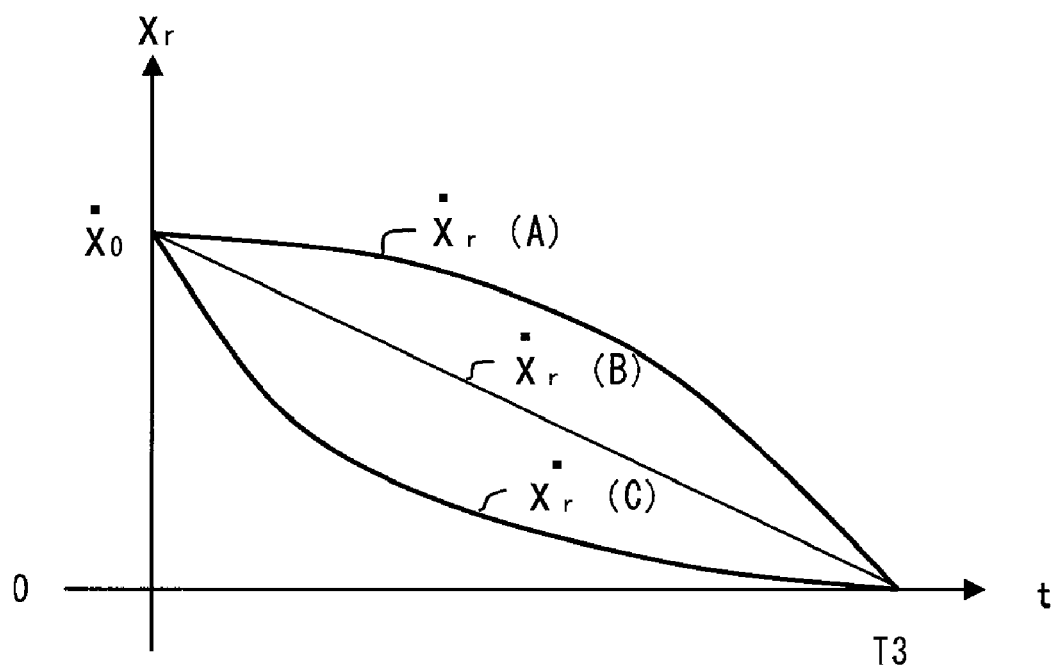
FIG. 5 is a view showing an example of a vehicle velocity command that is set at the time of deceleration according to the first embodiment.
Figure 6:
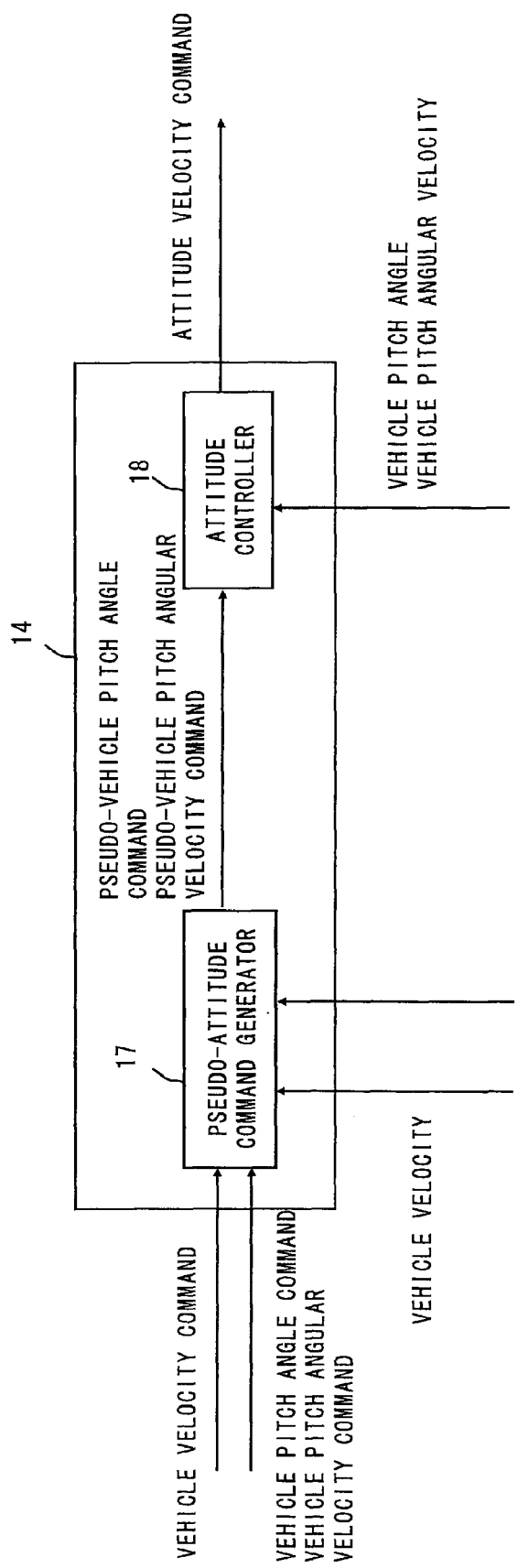
FIG. 6 is a control block diagram showing a more detailed configuration of a controller shown in FIG. 4.
Figure 7A:
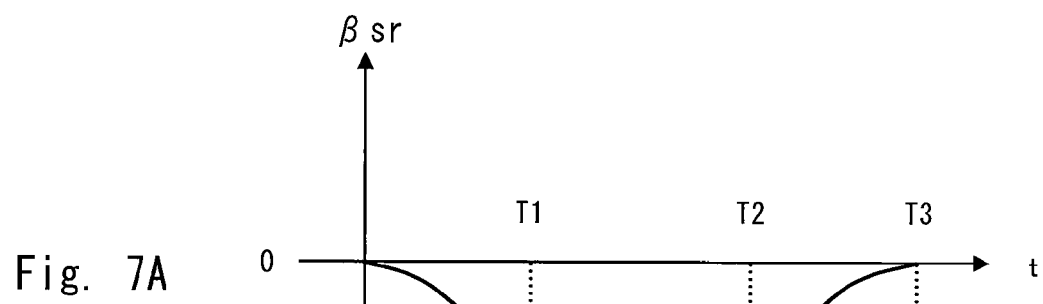
FIG. 7A is a view showing an example of a pseudo-vehicle pitch angle command that is set at the time of deceleration according to the first embodiment.
Figure 7B:
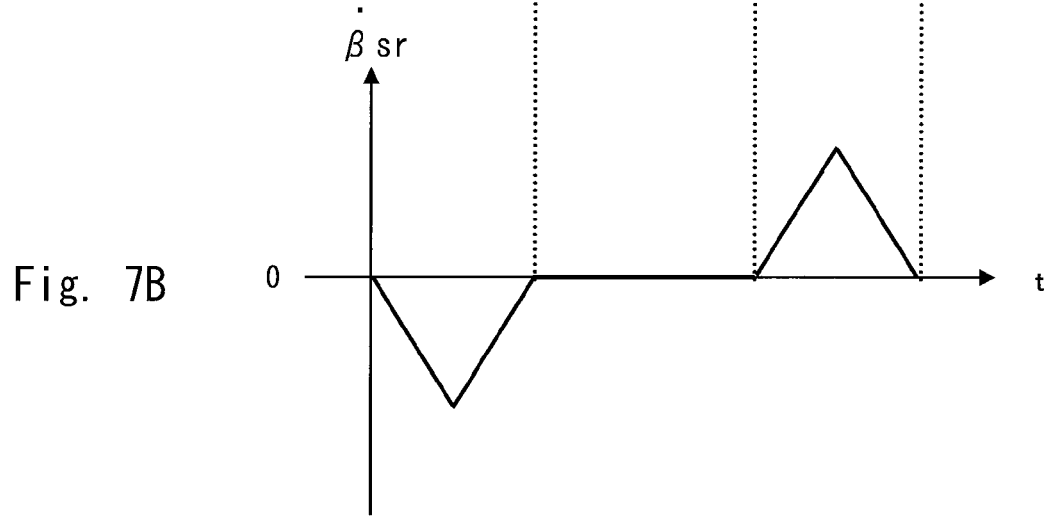
FIG. 7B is a view showing an example of a pseudo-vehicle pitch angular velocity command that is set at the time of deceleration according to the first embodiment.
Figure 8:
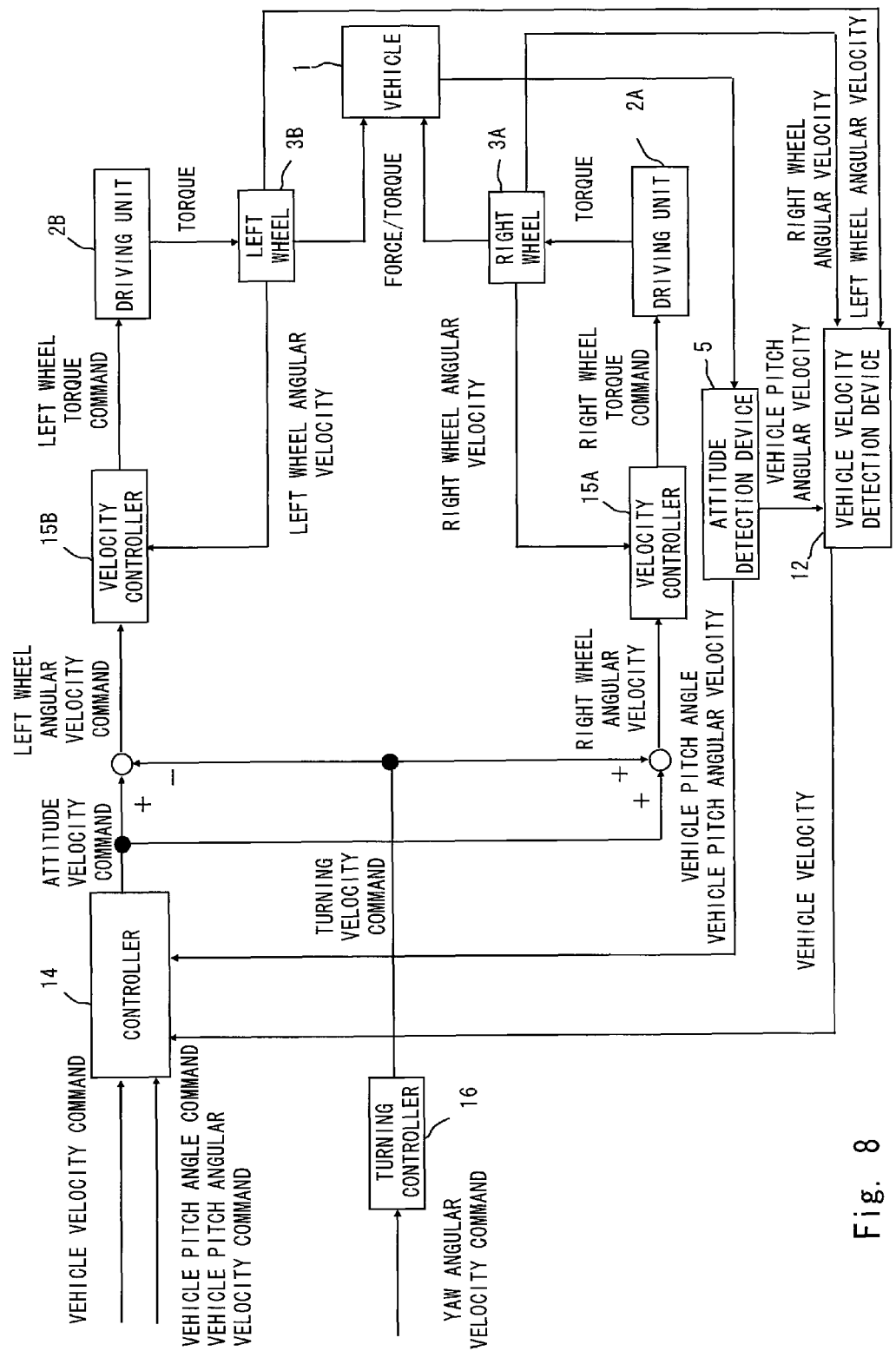
FIG. 8 is a control block diagram showing a configuration of a motion control system of the coaxial two-wheel vehicle according to the first embodiment.

Referring now to FIG. 4 to FIGS. 7A and 7B, vehicle motion control is described hereinafter in detail. FIG. 4 is a control block diagram showing a motion control system of the coaxial two-wheel vehicle according to the first embodiment. FIG. 5 is a view showing an example of a vehicle velocity command that is set at the time of deceleration. FIG. 6 is a control block diagram showing a more detailed configuration of a controller shown in FIG. 4. FIGS. 7A and 7B are views showing an example of a pseudo-vehicle pitch angle command and a pseudo-vehicle pitch angular velocity command, respectively, that are set at the time of deceleration. FIG. 8 is a view to describe the motion control system shown in FIG. 4 in further detail about the driving units 2A and 2B and the wheels 3A and 3B.

Variables to be used in the following description are described firstly. In the followings, the symbol $\beta$ denotes a vehicle pitch angle, and $\beta'$ denotes a vehicle pitch angular velocity. The symbol x denotes a vehicle position, and x' denotes a vehicle velocity. The vehicle pitch angle $\beta$, the vehicle pitch angular velocity $\beta'$, the vehicle position x and the vehicle velocity x' indicate detected values. Further, the symbol $\beta r$ denotes a vehicle pitch angle command, and $\beta' r$ denotes a vehicle pitch angular velocity command. The symbol xr denotes a vehicle position command, and x'r denotes a vehicle velocity command. The symbol $\gamma' r$ denotes a vehicle yaw angular velocity command. The vehicle pitch angle command $\beta r$, the vehicle pitch angular velocity command $\beta' r$, the vehicle position command xr, the vehicle velocity command x'r and the vehicle yaw angular velocity command $\gamma' r$ indicate command values, which are target values. Thus, a variable with a subscript r indicates a command value, and a variable without a subscript r indicates a detected value. Further, 2L denotes a tread width, and Rw denotes a wheel radius. In the following description, a dot above a variable means a time derivative. For example, one-time differentiation with respect to the vehicle position x is represented as the vehicle velocity x' or represented by placing a dot "•" above the variable "x". Because motion control at the time of deceleration of the vehicle velocity according to brake lever operation or velocity limit is described in the first embodiment, at least the vehicle pitch angle command, the vehicle pitch angular velocity command and the vehicle velocity command are input to a controller 14.

Referring to FIG. 4, the driving unit 2 independently drives a plurality of wheels 3 mounted coaxially. The driving unit 2 includes a motor and an amplifier for driving the respective wheels 3 and performs torque control in response to an input torque command. By the rotation of the motor, torque is applied to the wheels 3. Further, a reaction force of the torque is applied to the vehicle body 1 by the rotation of the motor, and a force as a reaction force from the ground is also applied to the vehicle body 1 by the rotation of the wheels 3.

A wheel angular velocity detector, which is not shown, detects the wheel angle and the wheel angular velocity, which are a relative angle and a relative angular velocity between the main body 1 and the wheels 3. The wheel angular velocity detector detects the wheel angle and the wheel angular velocity from encoder information that is placed at the rotational axis of the motor, for example.

The attitude detection device 5 detects the vehicle pitch angle and the vehicle pitch angular velocity of the main body 1. The attitude detection device 5 detects the vehicle pitch angle and the vehicle pitch angular velocity with use of a gyroscope or an acceleration sensor. Although the attitude detection device 5 detects both the vehicle pitch angle and the vehicle pitch angular velocity in this example, the attitude detection device 5 may detect only the vehicle pitch angle or only the vehicle pitch angular velocity.

The vehicle velocity detection device 12 calculates the current vehicle velocity from the wheel angular velocity that is detected by the wheel angular velocity detector and the vehicle pitch angular velocity that is detected by the attitude detection device 5. The current vehicle velocity is calculated by multiplying a difference (or a sum) of the vehicle pitch angular velocity and the wheel angular velocity by a wheel diameter. The vehicle velocity command setting device 13 determines a deceleration command (aVref=f(B, B', x')) according to a certain function f based on outputs of the brake detection device 8 and the vehicle velocity detection device 12, and sets a vehicle velocity command (current x'r=previous x'-aVref). The function f may be a format represented by f(B, B', x')=L1B+L2B'+L3x', for example, and the coefficients L1, L2 and L3 are determined so as to calculate a large deceleration command when the brake operation amount B, the brake operation velocity B' and the vehicle body velocity x' are large. FIG. 5 is a view showing a change in the vehicle velocity command with time when the deceleration command is different. In FIG. 5, x' indicates the vehicle velocity at the start of deceleration, and three vehicle velocity commands x'r(A), x'r(B) and x'r(C) with different deceleration commands are shown. Depending on the function f, a different property may be realized, such as calculating a large deceleration command when the vehicle body velocity is small. Further, when the vehicle velocity command becomes zero or negative, the vehicle velocity command is zero.

The controller 14 performs attitude control in such a way that the vehicle pitch angle and vehicle pitch angular velocity that are detected by the attitude detection device 5 and the vehicle velocity that is detected by the vehicle velocity detection device 12 follow the input vehicle pitch angle command and vehicle pitch angular velocity command and the vehicle velocity command determined by the vehicle velocity command setting device 13. Specifically, the controller 14 generates an attitude velocity command of the driving unit 2 based on the vehicle pitch angle and vehicle pitch angular velocity that are detected by the attitude detection device 5, the vehicle velocity that is detected by the vehicle velocity detection device 12, the vehicle pitch angle command and vehicle pitch angular velocity command that are input, and the vehicle velocity command that is determined by the vehicle velocity command setting device 13, and thereby makes control about the attitude velocity command.

Specifically, referring to FIG. 6, the controller 14 includes a pseudo-attitude command generator 17 and an attitude controller 18. When accelerating or decelerating the vehicle, the pseudo-attitude command generator 17 generates a pseudo-vehicle pitch angle command βsr and a pseudo-vehicle pitch angular velocity command β'sr based on the input vehicle pitch angle command βr, vehicle pitch angular velocity command β'r and vehicle velocity command x'r and vehicle velocity x'. A variable with a subscript sr indicates a pseudo-command value that is generated using the pseudo-attitude command generator 17. The pseudo-attitude command generator 17 calculates the pseudo-vehicle pitch angle command and the pseudo-vehicle pitch angular velocity command by using the following Expressions (1) and (2). In Expression (1), K1 indicates gain.

$$\beta_{sr} = \beta_r + K_1(\dot{x}_r - \dot{x}) \quad (1)$$

$$\dot{\beta}_{sr} = \frac{d\beta_{sr}}{dt} \quad (2)$$

During normal traveling, the vehicle pitch angle command βr and the vehicle pitch angular velocity command β'r both having a value of zero, and the vehicle velocity command x'r indicating the current vehicle velocity x', are input to the pseudo-attitude command generator 17. Thus, βsr=βr+K1(x'r−x')=βr=0 in the above Expression (1), and β'sr=dβsr/dt=0 in the above Expression (2). Accordingly, the attitude controller 18, which is described later, performs attitude control in such a way that the vehicle pitch angle β and the vehicle pitch angular velocity β' that occur in response to the shift of a rider's center of gravity are maintained to be zero.

When accelerating or decelerating the vehicle, the pseudo-attitude command generator 17 generates non-zero values as the pseudo-vehicle pitch angle command βsr and the pseudo-vehicle pitch angular velocity command β'sr in response to the input vehicle velocity command x'r. For example, when decelerating the vehicle, the vehicle velocity command x'r that is smaller than the current vehicle velocity x' is input to the pseudo-attitude command generator 17, and the pseudo-attitude command generator 17 generates command values that cause the vehicle to tilt backward as the values of the vehicle pitch angle command βr and the vehicle pitch angular velocity command β'r.

FIGS. 7A and 7B are views respectively showing a change in pseudo-vehicle pitch angle command and pseudo-vehicle pitch angular velocity command with time, which are set at the time of deceleration. Referring to FIG. 7A, after starting deceleration of the vehicle at time t=0, the pseudo-attitude command generator 17 substitutes the input vehicle pitch angle command βr and vehicle velocity command x'r and the detected vehicle velocity x' into Expression (1) and obtains the pseudo-vehicle pitch angle command βsr. Further, referring to FIG. 7B, the pseudo-attitude command generator 17 substitutes the obtained pseudo-vehicle pitch angle command βsr into Expression (2) and thereby obtains the pseudo-vehicle pitch angular velocity command β'sr. In the example shown in FIG. 7A, the pseudo-vehicle pitch angle command βsr is obtained as a negative value (i.e. as a value to cause the vehicle to tilt backward). Then, as a difference between the vehicle velocity command x'r and the vehicle velocity x' increases from time t=0 to t=T1, the value of the pseudo-vehicle pitch angular velocity command β'sr becomes larger in the negative direction (i.e. the pseudo-vehicle pitch angular velocity command is generated so as to make the vehicle pitch angle tilt backward from the horizontal position). After that, a difference between the vehicle velocity command x'r and the vehicle velocity x' stays constant from time t=T1 to t=T2, and therefore the value of the pseudo-vehicle pitch angular velocity command β'sr becomes substantially constant and maintained so as to keep the vehicle pitch angle tilting backward. Further, as a difference between the vehicle velocity command x'r and the vehicle velocity x' decreases from time t=T2 to t=T3, the value of the pseudo-vehicle pitch angular velocity command β'sr becomes larger in the positive direction again (i.e. the pseudo-vehicle pitch angular velocity command is generated so as to make the vehicle pitch angle back to the horizontal position from the backward tilting position). Because the attitude controller 18 makes control so as to follow the generated pseudo-vehicle pitch angle command and pseudo-vehicle pitch angular velocity command as described later, the vehicle velocity decelerates when setting the vehicle pitch angle back to the horizontal position from the backward tilting position. Therefore, in the case of decelerating the vehicle, it is possible to decelerate the vehicle without falling down by generating the command that causes the vehicle to tilt backward once with use of the pseudo-attitude command generator 17.

During normal traveling, the attitude controller 18 performs attitude control in such a way that the detected vehicle pitch angle β and vehicle pitch angular velocity β' respectively follow the vehicle pitch angle command βr and vehicle pitch angular velocity command β'r. When accelerating or decelerating the vehicle, the attitude controller 18 performs attitude control in such a way that the detected vehicle pitch angle β and vehicle pitch angular velocity β' respectively follow the pseudo-vehicle pitch angle command βsr and pseudo-vehicle pitch angular velocity command β'sr that are generated by the pseudo-attitude command generator 17. Specifically, the attitude controller 18 calculates a difference between the input pseudo-vehicle pitch angle command βsr and pseudo-vehicle pitch angular velocity command β'sr and the detected vehicle pitch angle β and vehicle pitch angular velocity β' and performs Proportional-Integral-Derivative (PID) control in such a way that the difference converges to zero. The attitude controller 18 calculates an attitude velocity command by using the following Expression (3). In Expression (3), Kpp, Kdp and Kip indicate gain.

$$\text{Attitude velocity command} = K_{pp}(\beta_{sr}-\beta) + K_{dp}(\dot{\beta}_{sr}-\dot{\beta}) + K_{ip}\int(\beta_{sr}-\beta)dt \tag{3}$$

Due to those control gain, response of the motor that responds to the pseudo-vehicle pitch angle command βsr and the pseudo-vehicle pitch angular velocity command β'sr changes. For example, a motor rotor responds slowly with a response delay when the gain Kpp decreases, and it responds quickly when the gain Kpp increases. In this manner, it is possible to adjust a response time to an error between the pseudo-vehicle pitch angle command βsr and pseudo-vehicle pitch angular velocity command β'sr and the actually detected vehicle pitch angle β and vehicle pitch angular velocity β' according to a change in control gain. The attitude controller 18 may make control with use of H∞ control, fuzzy control or the like, not limited to PID control.

A turning controller 16 generates a turning velocity command based on the input yaw angular velocity command. The yaw angular velocity command is input by using the turning operation device 6 described above. The turning controller 16 decomposes the input yaw angular velocity command γ'r into a turning velocity command to the respective wheels 3 with use of the vehicle tread width 2L and the wheel radius Rw. The turning controller 16 calculates the turning velocity command by using the following Expression (4).

$$\text{Turning velocity command} = \frac{L\dot{\gamma}_r}{R_W} \tag{4}$$

The attitude velocity command that is generated by the controller 14 and the turning velocity command that is generated by the turning controller 16 are added by an adder (or subtracted by a subtracter) and input as a wheel angular velocity command to a velocity controller 15. In the case of generating the wheel angular velocity command for the right and left wheels 3A and 3B as shown in FIG. 8, right and left wheel angular velocity commands are calculated by using the following Expressions (5) and (6) from the attitude velocity command that is calculated by Expression (3) and the turning velocity command that is calculated by Expression (4).

Left wheel angular velocity command=Attitude velocity command−Turning velocity command (5)

Right wheel angular velocity command=Attitude velocity command+Turning velocity command (6)

Velocity controllers 15A and 15B calculate a difference between the input wheel angular velocity command and the wheel angular velocity detected by the wheel angular velocity detector, performs Proportional-Integral (PI) control so as to make the difference converge to zero, and thereby performs velocity control in such a way that the detected value becomes equal to the command value. Specifically, the velocity controllers 15A and 15B generate torque commands for the wheels 3 based on the input wheel angular velocity command and the wheel angular velocity detected by the wheel angular velocity detector, and output the torque commands to the driving unit 2. Because the velocity controllers 15A and 15B perform simple PI control or PD control based on encoder information of the motor, it is possible to achieve a sufficiently rapid control period with use of an inexpensive CPU.

With the above-described control system, it is possible to achieve attitude control in response to rider's weight shift and turn control in response to rider's operation or weight shift, and further vehicle velocity control in response to rider's brake operation and velocity control in the event of exceeding a vehicle velocity limit.

Second Embodiment

Figure 9:
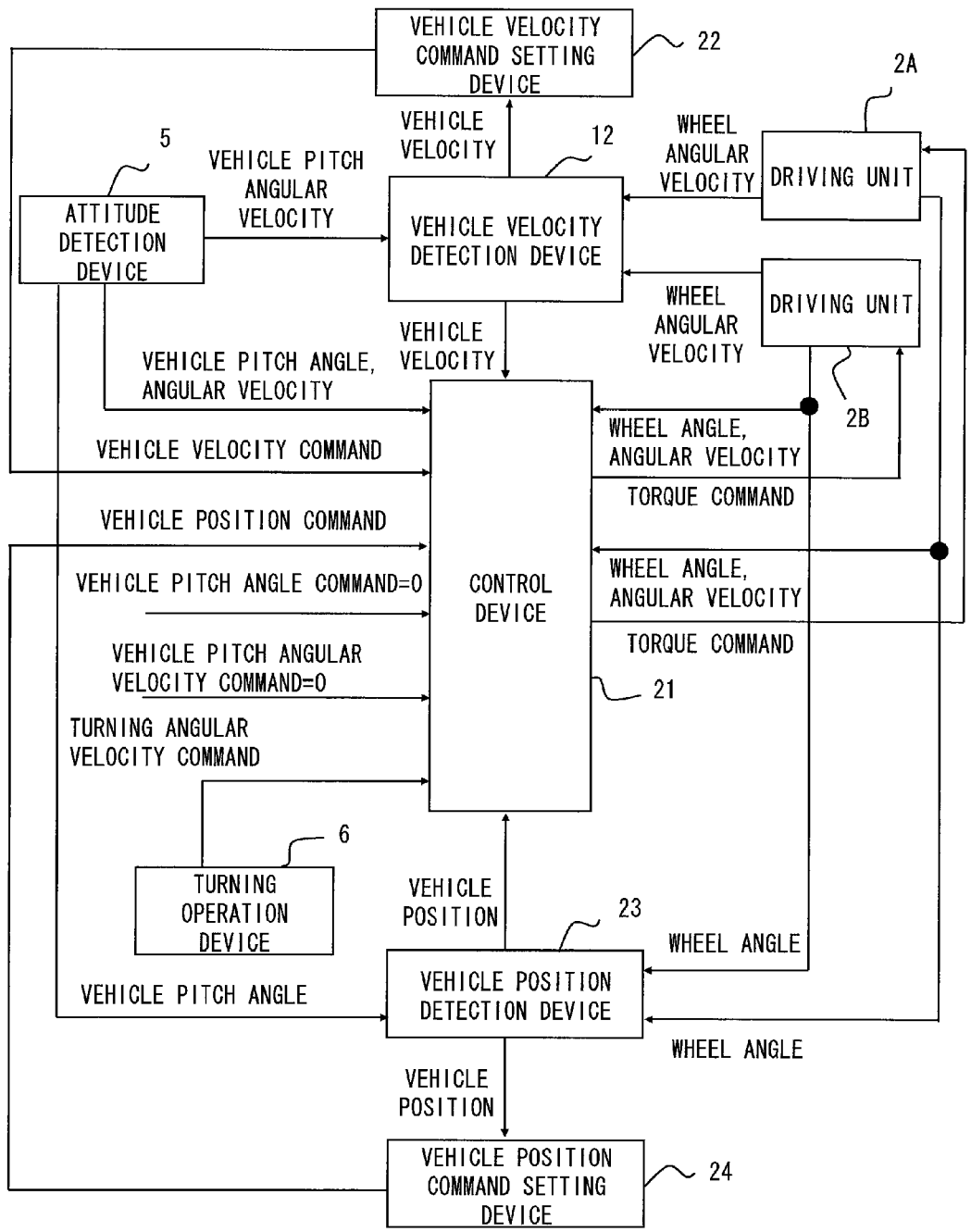
FIG. 9 is a control block diagram showing a configuration of vehicle control of a coaxial two-wheel vehicle according to a second embodiment of the present invention.

FIG. 9 is a block diagram showing a configuration of vehicle control of a coaxial two-wheel vehicle according to a second embodiment of the present invention. A driving unit 2, an attitude detection device 5, a turning operation device 6 and a vehicle velocity detection device 12 are the same as those described in the first embodiment, and thus not explained in detail below.

A control device 21 controls the vehicle so as to stably follow a vehicle pitch angle command, a vehicle pitch angular velocity command, a vehicle velocity command, a vehicle position command, and a turning angular velocity command, which are target values. Specifically, the control device 21 calculates a driving torque that is necessary for stabilizing the entire system without falling down based on those target values and the information input from the attitude detection device 5 and the turning operation device 6, and drives the respective motors of the driving units 2A and 2B. Then, the wheel angle and the wheel angular velocity of the wheels 3A and 3B generated by the rotation of the respective motors of the driving units 2A and 2B are fed back to the control device 21. In such a configuration of vehicle control, the coaxial two-wheel vehicle moves forward or backward when a rider displaces the center of gravity forward or backward, and turns leftward or rightward when a rider operates the turning operation device 6.

A vehicle velocity command setting device 22 determines a deceleration from an input command related to the vehicle velocity command and an output of the vehicle velocity detection device 12, and thereby determines the vehicle velocity command. A vehicle position detection device 23 calculates the current vehicle position from the relative angle between the main body 1 and the wheels 3A and 3B detected by the driving units 2A and 2B and the vehicle pitch angle detected by the attitude detection device 5. The current vehicle position is calculated by multiplying a difference between the vehicle pitch angle and the wheel angle by a wheel diameter. Then, a vehicle position command setting device 24 determines the vehicle position command from an input command related to the vehicle position command and an output of the vehicle position detection device 23. The control device 21 thereby controls the vehicle so as to stably follow the vehicle pitch angle command (=0; i.e., maintaining the horizontal position), the vehicle pitch angular velocity command (=0; i.e., maintaining the current angle), the vehicle velocity command, the vehicle position command and the turning angular velocity command.

The above-described target values (vehicle pitch angle command, vehicle pitch angular velocity command, vehicle velocity command, vehicle position command and turning angular velocity command) may be generated and input by various means. For example, a joystick for operating the coaxial two-wheel vehicle may be provided, and the commands may be input to the control device 21 in response to rider's operation of the joystick. In this case, an operation signal related to the vehicle velocity command is output to the vehicle velocity command setting device 22 according to the operation amount and operation velocity of an operating stick of the joystick. Concurrently, an operation signal related to the vehicle position command is output to the vehicle position command setting device 24 according to the operation amount and operation direction of the operating stick of the joystick. Alternatively, the commands to the control device 21 described above may be externally input by wireless means or the like without using a command input device such as a joystick, regardless of the presence or absence of a rider. Further, trajectory planning of traveling trajectory of the coaxial two-wheel vehicle may be conducted, and the above-described commands may be generated and input based on the trajectory planning. Specifically, a predetermined motion pattern may be set in advance for desired vehicle control action, and the vehicle velocity command in accordance with the motion pattern may be determined. Then, the vehicle position command may be generated by integrating the determined vehicle velocity command.

Figure 10:
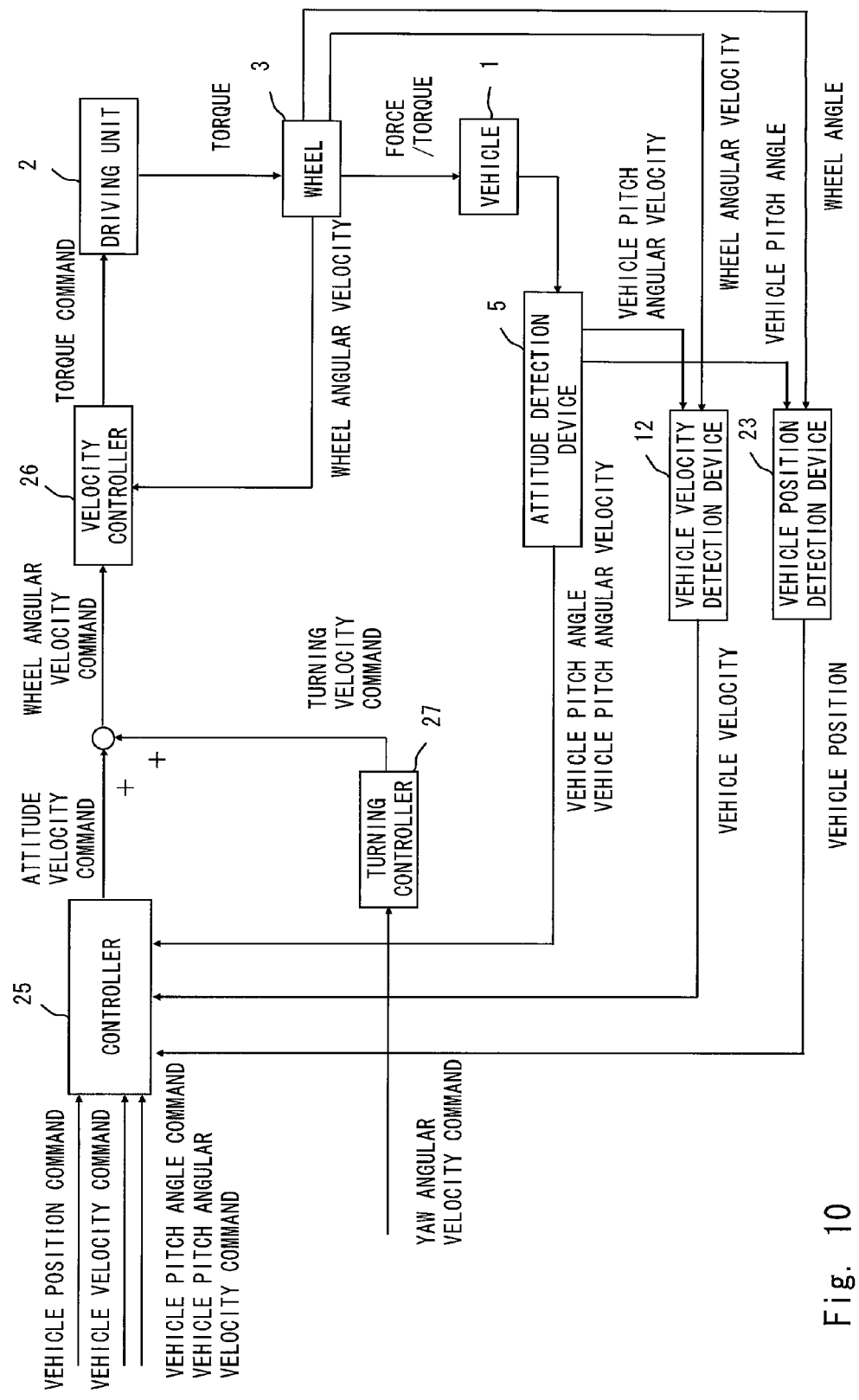
FIG. 10 is a control block diagram showing a configuration of a motion control system of the coaxial two-wheel vehicle according to the second embodiment.
Figure 11:
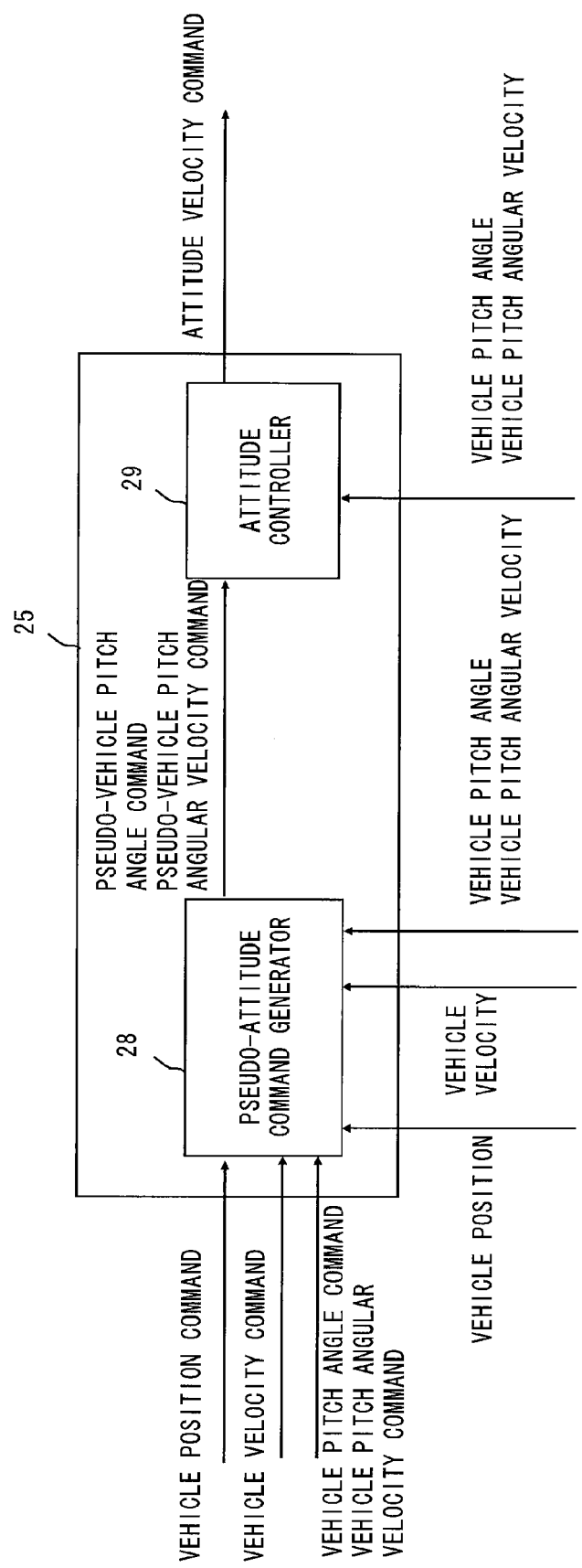
FIG. 11 is a control block diagram showing a more detailed configuration of a controller shown in FIG. 10.
Figure 12:
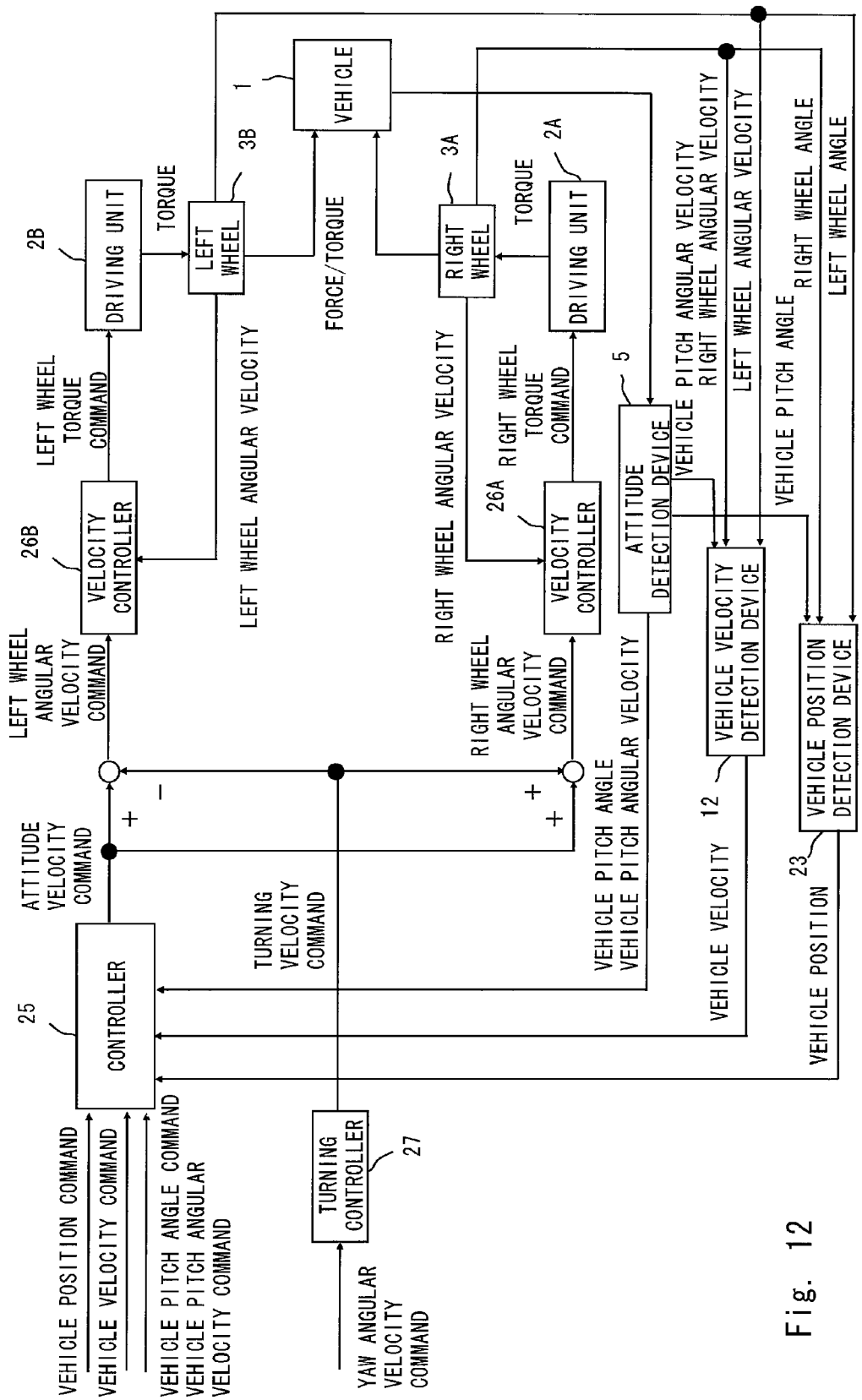
FIG. 12 is a control block diagram showing a configuration of a motion control system of the coaxial two-wheel vehicle according to the second embodiment.

Vehicle motion control is described hereinafter in detail with reference to FIGS. 10 to 12. FIG. 10 is a control block diagram showing a motion control system of the coaxial two-wheel vehicle according to the second embodiment. FIG. 11 is a control block diagram showing a more detailed configuration of a controller shown in FIG. 10. FIG. 12 is a diagram to describe the motion control system shown in FIG. 10 in further detail regarding the driving units 2A and 2B and the wheels 3A and 3B. Variables that are used in the following description are the same as the variables described in the first embodiment, and thus not explained in detail below. In the second embodiment, at least the vehicle pitch angle command, the vehicle pitch angular velocity command, the vehicle velocity command and the vehicle position command are input to a controller 25.

Referring to FIG. 10, the controller 25 performs attitude control in such a way that the vehicle pitch angle and vehicle pitch angular velocity that are detected by the attitude detection device 5, the vehicle velocity that is detected by the vehicle velocity detection device 12, and the vehicle position that is detected by the vehicle position detection device 23 follow the input vehicle pitch angle command and vehicle pitch angular velocity command, the vehicle velocity command determined by the vehicle velocity command setting device 22, and the vehicle position command determined by the vehicle position command setting device 24. Specifically, the controller 25 generates an attitude velocity command of the driving unit 2 based on the vehicle pitch angle and vehicle pitch angular velocity that are detected by the attitude detection device 5, the vehicle velocity that is detected by the vehicle velocity detection device 12, the vehicle position that is detected by the vehicle position detection device 23, the vehicle pitch angle command and vehicle pitch angular velocity command that are input, the vehicle velocity command that is determined by the vehicle velocity command setting device 22, and the vehicle position command that is determined by the vehicle position command setting device 24, and thereby makes control about the attitude velocity command.

Specifically, referring to FIG. 11, the controller 25 includes a pseudo-attitude command generator 28 and an attitude controller 29. When accelerating or decelerating the vehicle, the pseudo-attitude command generator 28 generates a pseudo-vehicle pitch angle command $\beta sr$ and a pseudo-vehicle pitch angular velocity command $\beta' sr$ based on the input vehicle pitch angle command $\beta r$, vehicle pitch angular velocity command $\beta' r$, vehicle velocity command x'r and vehicle position command xr, and the detected vehicle pitch angle $\beta$, vehicle pitch angular velocity $\beta'$, vehicle velocity x' and vehicle position x.

A method of generating the pseudo-vehicle pitch angle command $\beta sr$ and the pseudo-vehicle pitch angular velocity command $\beta' sr$ by the pseudo-attitude command generator 28 is described hereinafter. First, in the case where a rider is on board, a physical model of the vehicle plus the rider is obtained. Parameters at the design stage are used for the vehicle, and an equation of motion is established assuming average values of height and weight for the rider. The equation of motion is linearly approximated, thereby obtaining the state representation of the system (the vehicle plus the rider) that is expressed by the following Expression (7). In the expression, z indicates a state variable, and u indicates a control input. Further, A indicates a 4-by-4 matrix, and B indicates a 4-by-1 matrix. In the case where a rider is not on board, the pseudo-vehicle pitch angle command $\beta sr$ and the pseudo-vehicle pitch angular velocity command $\beta' sr$ can be obtained based on the physical model excluding the rider.

$$\dot{z}=Az+Bu \; z=[x \beta \dot{x} \dot{\beta}]' \qquad (7)$$

In this system, state feedback control represented by the following Expression (8) is performed, so that the system is stabilized. K indicates a feedback gain matrix.

$$u = -Kz \quad (8)$$

The system can be thereby implemented as a closed-loop system represented by the following Expression (9).

$$\dot{z} = (A - BK)z \quad (9)$$

In the above Expression (9), a command zr of the state variable z is added, thereby obtaining the expressions described below. It is thereby possible to perform control for stably following the commands.

The state variable z after Δt second can be calculated by z+z'Δt. Thus, when the initial value of the state variable z is z0, the state variable z is calculated sequentially as shown below by using the above Expression (9). In the following expression, zr1, zr2 . . . indicate the command zr of the state variable at each time point, and they are input by the above-described means. Thus, the state z on the simulation based on the physical model and the actual measured value can be obtained.

z0 z1=z0+z'Δt=z0+(A−BK)(zr1−z0)

z2=z1+z'Δt=z1+(A−BK)(zr2−z1)

z3=z2+z'Δt=z2+(A−BK)(zr3−z2)

Among the elements of the state variable z calculated as above, the vehicle pitch angle β and the vehicle pitch angular velocity β' are output as the pseudo-vehicle pitch angle command βsr and the pseudo-vehicle pitch angular velocity command β'sr, respectively. By generating the vehicle pitch angle and the vehicle pitch angular velocity that are necessary for causing the vehicle to perform desired motion as pseudo-attitude commands, the attitude controller 29 makes control so as to follow the generated pseudo-attitude commands. Consequently, the vehicle performs desired behavior. If an error between the assumed physical model and the actual system is large, a problem occurs in the use of the state variable z that is calculated based on the simulation as the pseudo-attitude commands. However, in the configuration in which control performed by the controller 25 is divided into attitude control and position and velocity control, which are respectively performed by the attitude controller 29 and the pseudo-attitude command generator 28, the attitude control parameters and the position and velocity control parameters can be adjusted independently of each other, and it is thus possible to easily adjust the control parameters by some trial and error.

The attitude controller 29 performs attitude control in such a way that the detected vehicle pitch angle β and vehicle pitch angular velocity β' follow the vehicle pitch angle command βr and vehicle pitch angular velocity command β'r, respectively. When accelerating or decelerating the vehicle, the attitude controller 29 performs attitude control in such a way that the detected vehicle pitch angle β and vehicle pitch angular velocity β' follow the pseudo-vehicle pitch angle command βsr and the pseudo-vehicle pitch angular velocity command β'sr that are generated by the pseudo-attitude command generator 28. A turning controller 27 generates a turning velocity command based on an input yaw angular velocity command. The yaw angular velocity command is input by using the turning operation device 6 described earlier. The attitude velocity command that is generated by the attitude controller 29 and the turning velocity command that is generated by the turning controller 27 are added by an adder (or subtracted by a subtracter) and input as a wheel angular velocity command to a velocity controller 26. In the case of generating the wheel angular velocity command for the right and left wheels 3A and 3B as shown in FIG. 12, right and left wheel angular velocity commands are calculated from the attitude velocity command that is calculated by the attitude controller 29 and the turning velocity command that is calculated by the turning controller 27. The velocity controller 26 calculates a difference between the input wheel angular velocity command and the wheel angular velocity detected by the wheel angular velocity detector, performs Proportional-Integral (PI) control so as to make the difference converge to zero, and performs velocity control in such a way that the detected value becomes equal to the command value. Control performed by the attitude controller 29, the turning controller 27 and the velocity controller 26 is respectively the same as the control performed by the attitude controller 18, the turning controller 16 and the velocity controller 15 in the first embodiment described earlier, and thus not explained in detail below.

Control when a rider is riding the vehicle and when the vehicle is empty is respectively described in further detail below. As MB (the mass of the vehicle body) and JB (the moment of inertia of the vehicle body) in the physical model which is described later, linearization is performed by using the composite mass and the composite moment of inertia of the vehicle plus the rider when the vehicle is occupied, and linearization is performed by using the mass and the moment of inertia of only the vehicle when the vehicle is empty. The physical model can be expressed by using the state representation shown in the following Expression (11), with use of the state representation of the system that is expressed by the following Expression (10) where x indicates a state variable, u indicates a control input and A and B indicate matrixes. In the following expression, θw indicates the angle of the wheel, and θB indicates the angle of the vehicle body. Further, θ'w indicates the angular velocity of the wheel, and θ'B indicates the angular velocity of the vehicle body. A subscript w indicates a variable related to the wheel, and a subscript B indicates a variable related to the vehicle body.

$$\dot{x} = Ax + Bu \quad (10)$$

$$\frac{d}{dt}\begin{pmatrix} \theta_w \\ \theta_B \\ \dot{\theta}_w \\ \dot{\theta}_B \end{pmatrix} = A \begin{pmatrix} \theta_w \\ \theta_B \\ \dot{\theta}_w \\ \dot{\theta}_B \end{pmatrix} + B\tau \quad (11)$$

By performing state feedback when the control input u is torque τ as shown in the following Expression (12), the system can be stabilized. The gain K can be obtained by using a technique such as pole assignment of (A−BK) or optimal regulator.

$$\tau = -Kx \quad K = (k_1 k_2 k_3 k_4) \quad (12)$$

Figure 14:
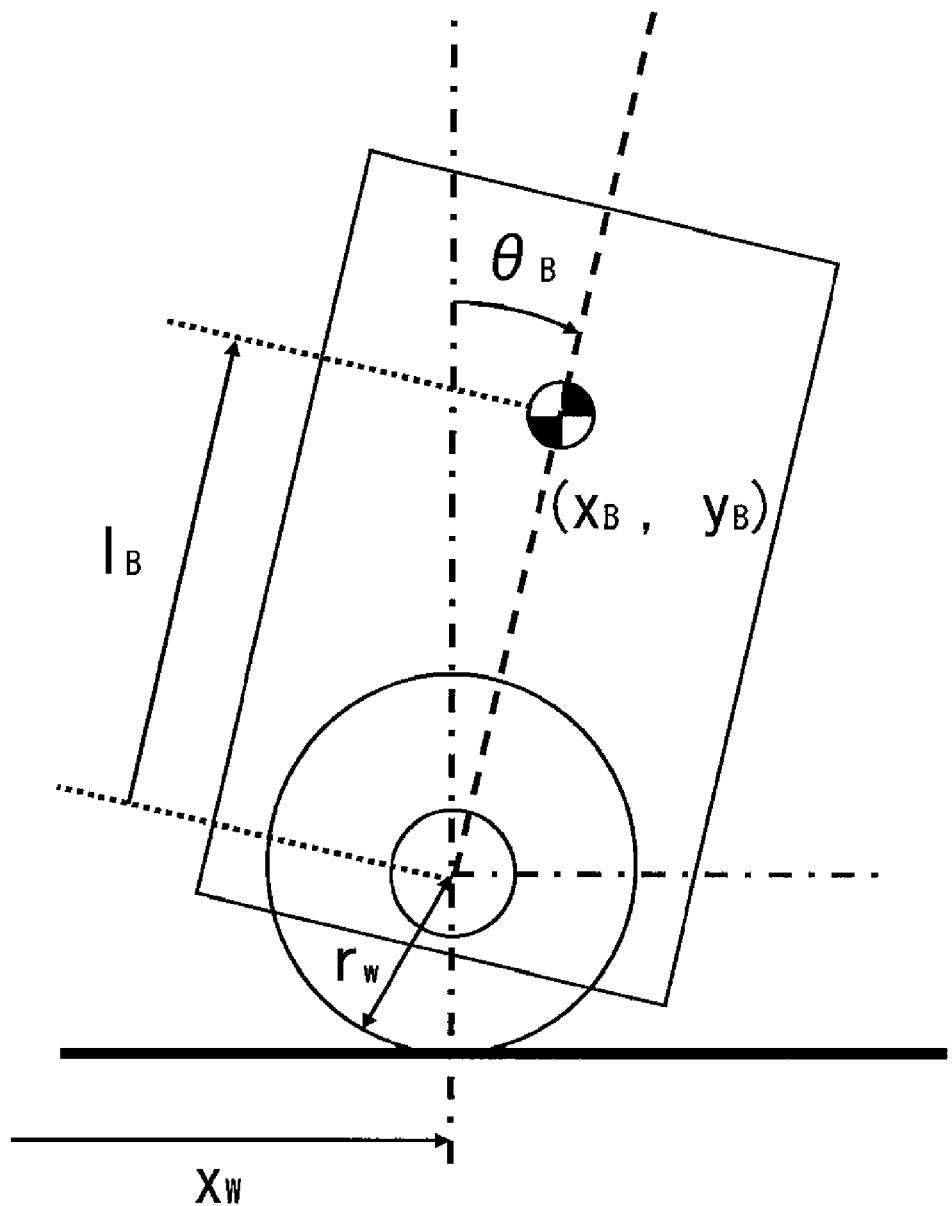
FIG. 14 is a control block diagram showing a configuration of vehicle control of a coaxial two-wheel vehicle according to another embodiment.
Figure 15:
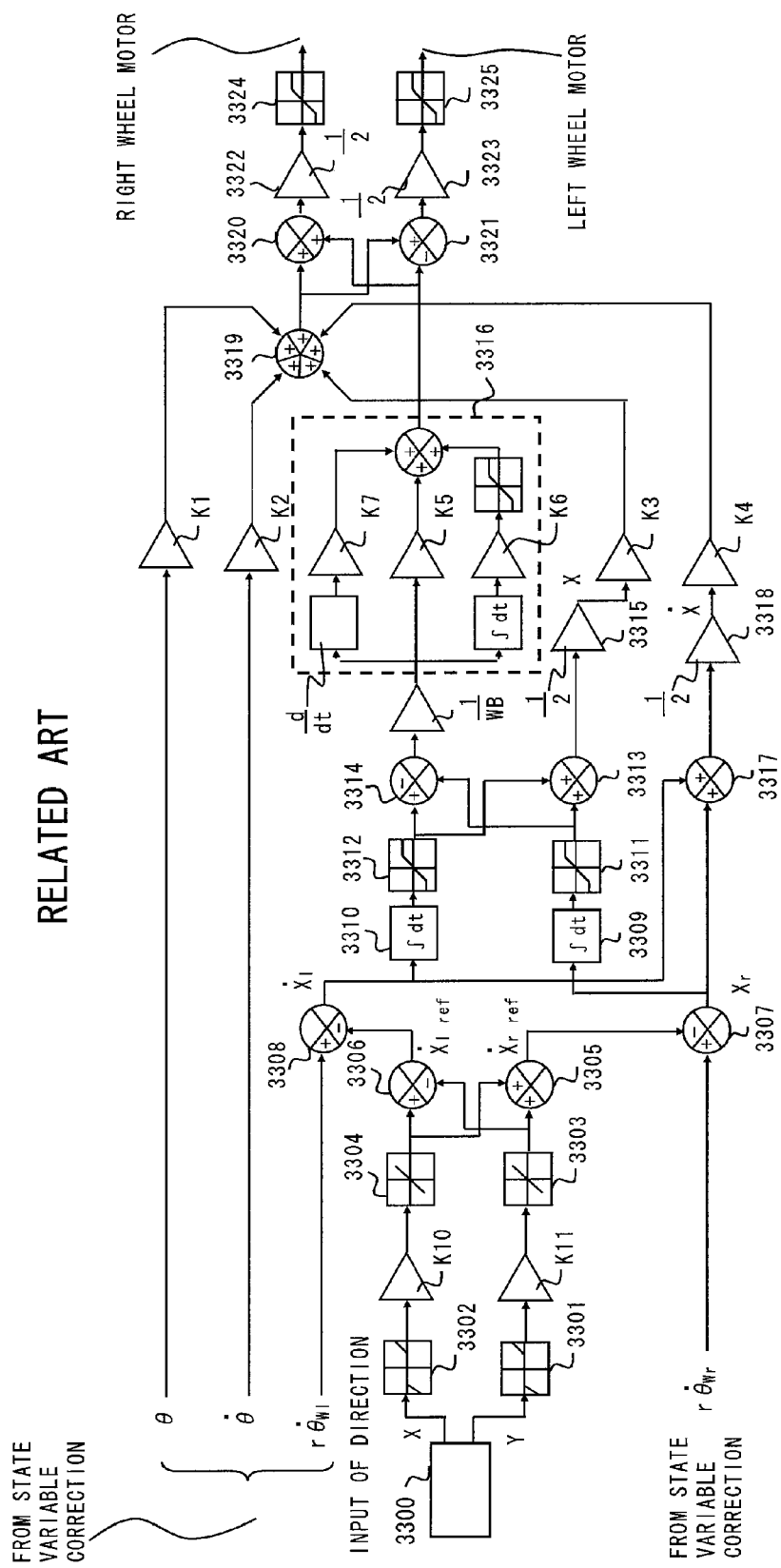
FIG. 15 is a control block diagram showing a configuration of a control system of a related coaxial two-wheel vehicle.

Referring then to FIG. 14, a physical model of a typical wheel inverted pendulum is described hereinafter. First, variables to be used in the following description are described. M denotes the mass [kg] of the system (vehicle+rider). When a rider is riding the vehicle, MB indicates the composite mass of the vehicle plus the rider, and when the vehicle is empty, MB indicates the mass of the vehicle only. J denotes the moment of inertia [kgm2] applied to the system. When a rider is riding the vehicle, JB indicates the composite moment of inertia of the vehicle plus the rider, and when the vehicle is empty, JB indicates the moment of inertia of the vehicle only. x denotes a horizontal position [m] from the origin, and y denotes a vertical position [m] from the axle. θ denotes an angle [rad]. 1B denotes a distance [m] from the axle to the center of gravity of a step board (vehicle body). rw denotes a wheel radius [m]. g denotes a gravitational acceleration [m/s2]. Dθ denotes a viscous friction coefficient (running resistance) [Nms] between the step board and the wheel. Dθw denotes a viscous friction coefficient (running resistance) [Nms] between the wheel and the road. A subscript w means a variable related to the wheel, and a subscript B means a variable related to the step board.

First, the following Expressions (13) and (14) are obtained about the kinetic energy and the potential energy of the wheel.

$$T_W = \frac{1}{2}M_W \dot{x}_W^2 + \frac{1}{2}J_W \dot{\theta}_W^2 \tag{13}$$

$$U_W = 0 \tag{14}$$

Next, the following Expressions (15) and (16) are obtained about the kinetic energy and the potential energy of the step board.

$$T_B = \frac{1}{2}M_B(\dot{x}_B^2 + \dot{y}_B^2) + \frac{1}{2}J_B \dot{\theta}_B^2 = \tag{15}$$
$$\frac{1}{2}M_B(\dot{x}_W^2 + 2\dot{x}_W \dot{\theta}_B l_B \cos\theta_B + l_B^2 \dot{\theta}_B^2) + \frac{1}{2}J_B \dot{\theta}_B^2$$

$$U_B = M_B g y_B = M_B g l_B \cos\theta_B \tag{16}$$

On the basis of $$x_W = r_W \theta_W \tag{17}$$

Lagrangian L is obtained for each of the wheel and the step board as shown in the following Expressions (18).

$$\left.\begin{array}{l} L = (T_W + T_B) - (U_W + U_B) \\ \frac{d}{dt}\left(\frac{\partial L}{\partial \dot{\theta}_W}\right) - \frac{\partial L}{\partial \theta_W} + D_\theta(\dot{\theta}_W - \dot{\theta}_B) + D_{\theta w}\dot{\theta}_W = \tau \\ \frac{d}{dt}\left(\frac{\partial L}{\partial \dot{\theta}_B}\right) - \frac{\partial L}{\partial \theta_B} + D_\theta(\dot{\theta}_B - \dot{\theta}_W) = -\tau \end{array}\right\} \tag{18}$$

Accordingly, the equation of motion is obtained as shown in the following Expressions (19) to (21).

$$\ddot{\theta}_W = \frac{M_B r_W l_B \sin\theta_B (M_B l_B^2 + J_B)}{D}\dot{\theta}_B^2 - \tag{19}$$
$$\frac{D_\theta(M_B l_B^2 + J_B + M_B r_W l_B \cos\theta_B)}{D}(\dot{\theta}_W - \dot{\theta}_B) -$$
$$\frac{D_{\theta w}(M_B l_B^2 + J_B)}{D}\dot{\theta}_W - \frac{M_B^2 g l_B^2 r_W \sin\theta_B \cos\theta_B}{D} +$$
$$\frac{M_B l_B^2 + J_B + M_B r_W l_B \cos\theta_B}{D}\tau$$

$$\ddot{\theta}_B = \frac{M_B^2 l_B^2 r_W \sin\theta_B \cos\theta_B}{D}\dot{\theta}_B^2 + \tag{20}$$
$$\frac{D_\theta\{(M_B + M_W)r_W^2 + J_W + M_B l_B r_W \cos\theta_B\}}{D}(\dot{\theta}_W - \dot{\theta}_B) +$$
$$\frac{D_{\theta w} M_B l_B r_W \cos\theta_B}{D}\dot{\theta}_W + \frac{M_B g l_B \sin\theta_B\{(M_B + M_W)r_W^2 + J_W\}}{D} -$$
$$\frac{M_B l_B r_W \cos\theta_B (M_B + M_W)r_W^2 + J_W}{D}\tau$$

$$D = \{(M_B + M_W)r_W^2 + J_W\}(M_B l_B^2 + J_B) - M_B^2 l_B^2 r_W^2 \cos^2\theta_B \tag{21}$$

Further, on the basis of $$\theta_B \ll 1, \dot{\theta}_B \ll 1 \rightarrow \sin\theta_B = \theta_B, \cos\theta_B = 1, \dot{\theta}_B^2 = 0 \tag{22}$$, the above-described equation of motion can be linearized as shown in the following Expressions (23) to (25).

$$\ddot{\theta}_W = -\frac{D_\theta(M_B l_B^2 + J_B + M_B r_W l_B)}{D}(\dot{\theta}_W - \dot{\theta}_B) - \tag{23}$$
$$\frac{D_{\theta w}(M_B l_B^2 + J_B)}{D}\dot{\theta}_W - \frac{M_B^2 g l_B^2 r_W}{D}\theta_B + \frac{M_B l_B^2 + J_B + M_B r_W l_B}{D}\tau$$

$$\ddot{\theta}_B = \frac{D_\theta\{(M_B + M_W)r_W^2 + J_W + M_B l_B r_W\}}{D}(\dot{\theta}_W - \dot{\theta}_B) + \tag{24}$$
$$\frac{D_{\theta w} M_B l_B r_W}{D}\dot{\theta}_W + \frac{M_B g l_B \sin\theta_B\{(M_B + M_W)r_W^2 + J_W\}}{D} -$$
$$\frac{M_B l_B r_W + (M_B + M_W)r_W^2 + J_W}{D}\tau$$

$$D = \{(M_B + M_W)r_W^2 + J_W\}(M_B l_B^2 + J_B) - M_B^2 l_B^2 r_W^2 \tag{25}$$

With the control system described above, attitude control, turn control, vehicle velocity control and vehicle position control can be achieved simultaneously.

Other Embodiments

Although the attitude controller performs velocity control based on PID control in the first and second embodiments described above, the present invention is not limited thereto. For example, the attitude controller may perform control by generating a torque command based on the state feedback or may perform control by generating a position command based on the Zero Moment Point (ZMP) principle.

Figure 13:
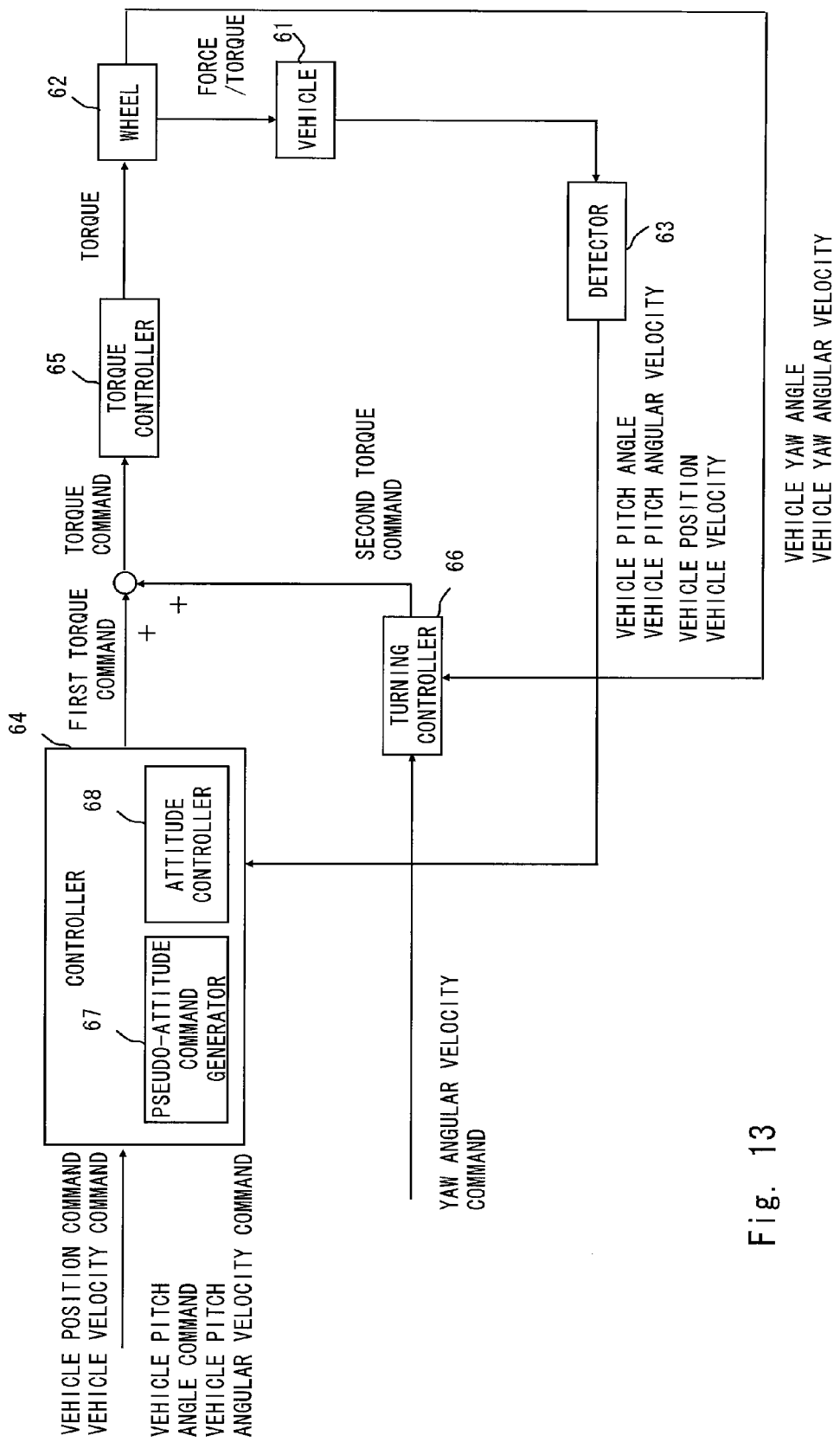
FIG. 13 is a view to describe a physical model of a typical wheel inverted pendulum of the coaxial two-wheel vehicle according to the second embodiment.

FIG. 13 is a control block diagram showing a motion control system of a coaxial two-wheel vehicle in the case where an attitude controller generates a torque command. A controller 64 includes a pseudo-attitude command generator 67 and an attitude controller 68. The pseudo-attitude command generator 67 generates a pseudo-vehicle pitch angle command and a pseudo-vehicle pitch angular velocity command as described earlier. The attitude controller 68 receives a pseudo-vehicle pitch angle command, a pseudo-vehicle pitch angular velocity command, a vehicle position command, a vehicle velocity command and so on, and performs control based on a deviation from a vehicle pitch angle, a vehicle pitch angular velocity, a vehicle position, a vehicle velocity and so on that are detected by a detector 63. Specifically, a first torque command generated by the attitude controller 68 and a second torque command generated by a turning controller 66 are added or subtracted to generate a torque command, and the torque command is input to a torque controller 65 composed of a motor amplifier, thereby performing drive control of a wheel 62. As control of the attitude controller 68, PID control, H∞ control, fuzzy control or the like may be used. The turning controller 66 receives a yaw angular velocity command or the like, and performs control based on a deviation from a vehicle yaw angular velocity or the like that is detected based on encoder information of a motor, which is not shown. As control of the turning controller 66, PD control, PID control or the like may be used.

As described in the foregoing, according to the embodiments of the present invention, in addition to the attitude controller that controls the attitude of the vehicle, the pseudo-attitude command generator that generates a command to be input to the attitude controller is provided. When accelerating or decelerating the vehicle, the pseudo-attitude command generator generates a pseudo-attitude command based on a vehicle velocity command. It is thereby possible to easily implement a control system capable of performing quick and easy adjustment of control parameters of the system as a whole and further having high robustness. This is because adjustment of control parameters in the attitude controller can be performed relatively easily without particular need of an accurate model, and high robustness against load variation or the like can be achieved. Further, because control parameters of the pseudo-attitude command generator can be adjusted independently of the control parameters of the attitude controller, adjustment of the control parameters is facilitated.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

According to the embodiments of the present invention described above, it is possible to provide a travel device that enables easy implementation of a control system capable of performing quick and easy adjustment of control parameters and further having high robustness, and a control method of the same.

What is claimed is:

1. A travel device comprising:
a driving unit that independently drives a plurality of wheels mounted coaxially;
a main body that joins the plurality of wheels;
an attitude detector that detects at least one of an attitude angle and an attitude angular velocity as attitude information of the main body;
a wheel angular velocity detector that detects a relative angular velocity between the main body and the plurality of wheels as a wheel angular velocity;
a vehicle velocity detector that detects a vehicle velocity based on the detected wheel angular velocity of the plurality of wheels and the attitude angular velocity detected by the attitude detector;
a pseudo-attitude command generator that generates at least one of a pseudo-attitude angle command and a pseudo-attitude angular velocity command as a pseudo-attitude information command of the main body based on the detected vehicle velocity, an input attitude information command and an input vehicle velocity command when accelerating or decelerating a vehicle; and
an attitude controller that generates a drive command of the driving unit in such a way that the attitude information detected by the attitude detector follows the pseudo-attitude information command of the main body generated by the pseudo-attitude command generator,
wherein a motor of the driving unit is driven for traveling according to the drive command generated by the attitude controller.

2. The travel device according to claim 1, further comprising:
a wheel angle detector that detects a relative angle between the main body and the plurality of wheels as a wheel angle; and
a vehicle position detector that detects a vehicle position of the vehicle based on the detected wheel angle of the plurality of wheels and the attitude angle detected by the attitude detector;
wherein the pseudo-attitude command generator generates the pseudo-attitude information command of the main body based on the detected attitude information, the vehicle velocity detected by the vehicle velocity detector, the vehicle position detected by the vehicle position detector, the input attitude information command, the input vehicle velocity command and an input vehicle position command.

3. The travel device according to claim 1, further comprising:
a brake lever; and
a vehicle velocity command setter that sets a vehicle velocity command of the vehicle,
wherein, when the brake lever is operated, the vehicle velocity command setter changes the set vehicle velocity command according to an operation amount of the brake lever and the vehicle velocity detected by the vehicle velocity detector.

4. The travel device according to claim 1, wherein, when the vehicle velocity detected by the vehicle velocity detector exceeds a predetermined velocity limit, the input vehicle velocity command is changed according to the vehicle velocity detected by the vehicle velocity detector.

5. The travel device according to claim 1, further comprising:
a velocity controller that generates a torque command for driving the plurality of wheels, wherein when the vehicle is accelerated or decelerated,
the attitude controller generates an attitude velocity command of the driving unit based on the attitude information detected by the attitude detector and the pseudo-attitude information command of the main body generated by the pseudo-attitude command generator,
the velocity controller generates a torque command of the plurality of wheels based on the attitude velocity command generated by the attitude controller and the wheel angular velocity detected by the wheel angular velocity detector, and
the motor of the driving unit is driven for traveling according to the generated torque command.

6. The travel device according to claim 5, further comprising:
a turning controller that generates a turning velocity command of the travel device based on an input turning information command, wherein
the attitude controller generates an attitude velocity command of the driving unit based on the detected attitude information and the input attitude information command,
the wheel angular velocity command of the travel device is generated by adding or subtracting the attitude velocity command generated by the attitude controller and the turning velocity command generated by the turning controller and input to the velocity controller, and
the velocity controller performs velocity control in such a way that the wheel angular velocity detected by the wheel angular velocity detector follows the input wheel angular velocity command.

7. The travel device according to claim 1, further comprising:
a torque controller that generates a torque command for driving the plurality of wheels, wherein when the vehicle is accelerated or decelerated,
the attitude controller generates a first torque command of the driving unit based on the attitude information detected by the attitude detector and the pseudo-attitude information command of the main body generated by the pseudo-attitude command generator,
the torque controller generates a torque command of the plurality of wheels based on the first torque command generated by the attitude controller, and
the motor of the driving unit is driven for traveling according to the generated torque command.

8. The travel device according to claim 7, further comprising:
a turning detector that detects at least one of a turning angle and a turning angular velocity as turning information of the travel device; and
a turning controller that generates a second torque command of the travel device based on an input turning information command, wherein
the torque command of the travel device is generated by adding or subtracting the first torque command generated by the attitude controller and the second torque command generated by the turning controller and input to the torque controller, and
the turning controller performs torque control in such a way that the turning information detected by the turning detector follows the input turning information command.

9. A control method of a travel device that detects at least one of an attitude angle and an attitude angular velocity as attitude information of a main body joining a plurality of wheels mounted coaxially and travels by independently driving the plurality of wheels, the method comprising:
when accelerating or decelerating a vehicle,
detecting a relative angular velocity between the main body and the plurality of wheels as a wheel angular velocity;
detecting the attitude angular velocity and detecting a vehicle velocity based on the detected attitude angular velocity and the detected wheel angular velocity of the plurality of wheels;
setting a vehicle velocity command of the vehicle;
generating at least one of a pseudo-attitude angle command and a pseudo-attitude angular velocity command as a pseudo-attitude information command of the main body based on the detected vehicle velocity, an input attitude information command and the set vehicle velocity command; and
performing attitude control in such a way that the detected attitude information follows the generated pseudo-attitude information command of the main body.

* * * * *

UNITED STATES PATENT AND TRADEMARK OFFICE
CERTIFICATE OF CORRECTION

PATENT NO. : 7,945,367 B2
APPLICATION NO. : 12/511216
DATED : May 17, 2011
INVENTOR(S) : Yusuke Kosaka It is certified that error appears in the above-identified patent and that said Letters Patent is hereby corrected as shown below:

| Column | Line | |
|---|---|---|
| 9 | 50 | Before "indicates" change "x'" to --x'0--. |

Signed and Sealed this
Thirteenth Day of December, 2011

David J. Kappos
*Director of the United States Patent and Trademark Office*